(12) United States Patent
Lee et al.

(10) Patent No.: US 12,128,773 B2
(45) Date of Patent: Oct. 29, 2024

(54) VEHICLE DATA MANAGING SERVER, PLATFORM MANAGING SERVER AND SERVICE SERVER, AND SERVICE PROVIDING SYSTEM ASSOCIATED WITH AUTONOMOUS DRIVING PLATFORM

(71) Applicant: LG Energy Solution, Ltd., Seoul (KR)

(72) Inventors: Jin Woo Lee, Daejeon (KR); Dong Myung Kim, Daejeon (KR); Hyuk Sung Chung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/502,881

(22) Filed: Nov. 6, 2023

(65) Prior Publication Data

US 2024/0227565 A1    Jul. 11, 2024

(30) Foreign Application Priority Data

Jan. 10, 2023  (KR) .................. 10-2023-0003684
May 3, 2023   (KR) .................. 10-2023-0057648
Sep. 22, 2023 (KR) .................. 10-2023-0127390

(51) Int. Cl.
*B60L 3/00*     (2019.01)
*B60L 7/18*     (2006.01)
(Continued)

(52) U.S. Cl.
CPC .......... *B60L 3/0046* (2013.01); *B60L 3/0007* (2013.01); *B60L 7/18* (2013.01); *B60W 50/06* (2013.01);
(Continued)

(58) Field of Classification Search
None
See application file for complete search history.

(56) References Cited

U.S. PATENT DOCUMENTS 10,761,527 B2   9/2020  Way et al.
10,884,902 B2   1/2021  Kislovskiy et al.
(Continued)

FOREIGN PATENT DOCUMENTS

CN   111611709 A    9/2020
CN   111824170 A   10/2020
(Continued)

OTHER PUBLICATIONS

International Search Report for Application No. PCT/KR2023/016763 mailed Jan. 26, 2024, pp. 1-3.

*Primary Examiner* — Jonathan M Dager
(74) *Attorney, Agent, or Firm* — Lerner David LLP

(57) ABSTRACT

A service providing system associated with an autonomous driving platform is provided. A service providing system associated with a simulation platform is provided. The service providing system includes a platform managing server configured to manage the simulation platform that provides simulation related to a driving environment of a vehicle, a vehicle data managing server configured to acquire vehicle data including driving data related to driving of the vehicle and battery data related to a state of a battery of the vehicle and provide a simulation request based on the vehicle data and the vehicle data to the simulation platform, and a service server configured to manage energy management software that provides energy management data to the simulation platform in association with the simulation platform.

20 Claims, 26 Drawing Sheets

(51) Int. Cl.
*B60W 50/06* (2006.01)
*G05B 17/02* (2006.01)

(52) U.S. Cl.
CPC .......... *G05B 17/02* (2013.01); *B60L 2240/10* (2013.01); *B60W 2510/18* (2013.01); *B60W 2510/244* (2013.01); *B60W 2556/45* (2020.02)

(56) References Cited

U.S. PATENT DOCUMENTS

| | | | |
|---|---|---|---|
| 11,157,055 B2* | 10/2021 | Wells | H04L 9/50 |
| 11,215,675 B2* | 1/2022 | Shin | G01R 31/3835 |
| 11,521,439 B2 | 12/2022 | Becker | |
| 11,527,786 B1* | 12/2022 | Budan | G01R 31/396 |
| 2009/0198396 A1* | 8/2009 | Rodriguez | B60W 30/1882 701/22 |
| 2015/0239365 A1* | 8/2015 | Hyde | B60L 58/26 701/2 |
| 2015/0298555 A1* | 10/2015 | Bennett | B60L 58/13 701/22 |
| 2015/0329003 A1* | 11/2015 | Li | B60L 50/16 320/134 |
| 2017/0262790 A1* | 9/2017 | Khasis | G08G 1/012 |
| 2018/0086223 A1* | 3/2018 | Lindemann | B60L 58/13 |
| 2018/0238698 A1* | 8/2018 | Pedersen | G01C 21/3476 |
| 2018/0255508 A1 | 9/2018 | Lopes et al. | |
| 2018/0259956 A1* | 9/2018 | Kawamoto | B60W 60/0053 |
| 2019/0126775 A1* | 5/2019 | Han | B60L 3/12 |
| 2019/0176639 A1* | 6/2019 | Kumar | B60L 3/0046 |
| 2020/0001868 A1 | 1/2020 | Lee | |
| 2020/0015156 A1 | 1/2020 | Lopes et al. | |
| 2020/0156496 A1* | 5/2020 | Light-Holets | B60L 53/10 |
| 2020/0171966 A1 | 6/2020 | Steele et al. | |
| 2020/0198495 A1* | 6/2020 | Rizzoni | B60W 10/06 |
| 2020/0393260 A1* | 12/2020 | Falck | G06Q 10/08355 |
| 2021/0086647 A1* | 3/2021 | Kiessling | B60L 53/67 |
| 2021/0286920 A1 | 9/2021 | Nishida | |
| 2021/0362731 A1 | 11/2021 | Park | |
| 2021/0365698 A1 | 11/2021 | Zhou et al. | |
| 2022/0097557 A1* | 3/2022 | Lee | G06Q 50/40 |
| 2022/0105793 A1* | 4/2022 | Sukhatankar | B60L 15/2054 |
| 2022/0194429 A1 | 6/2022 | Cho | |
| 2022/0196418 A1* | 6/2022 | Wray | B60W 10/06 |
| 2022/0205796 A1* | 6/2022 | Wray | G01C 21/3407 |
| 2022/0391191 A1* | 12/2022 | Cho | H04W 8/245 |
| 2023/0226949 A1* | 7/2023 | Naito | G06Q 10/20 |
| 2023/0288489 A1* | 9/2023 | Jin | B60L 3/12 |
| 2023/0303091 A1* | 9/2023 | You | B60L 53/65 |
| 2023/0347778 A1* | 11/2023 | Shahriar | B60L 58/12 |

FOREIGN PATENT DOCUMENTS

| | | |
|---|---|---|
| JP | 2018025856 A | 2/2018 |
| JP | 2021018732 A | 2/2021 |
| JP | 2022508310 A | 1/2022 |
| JP | 7098672 B2 | 7/2022 |
| KR | 20140144921 A | 12/2014 |
| KR | 101572755 B1 | 12/2015 |
| KR | 101834851 B1 | 3/2018 |
| KR | 2019-0099148 A | 8/2019 |
| KR | 20190120812 A | 10/2019 |
| KR | 20210062205 A | 5/2021 |
| KR | 102275017 B1 | 7/2021 |
| KR | 102320624 B1 | 11/2021 |
| KR | 20210144171 A | 11/2021 |
| KR | 102340120 B1 | 12/2021 |
| KR | 102377233 B1 | 3/2022 |
| KR | 20220073883 A | 6/2022 |
| KR | 20220084456 A | 6/2022 |
| KR | 20220087240 A | 6/2022 |
| KR | 20220121932 A | 9/2022 |
| KR | 20220165059 A | 12/2022 |

* cited by examiner

VEHICLE DATA MANAGING SERVER, PLATFORM MANAGING SERVER AND SERVICE SERVER, AND SERVICE PROVIDING SYSTEM ASSOCIATED WITH AUTONOMOUS DRIVING PLATFORM

CROSS-REFERENCE TO RELATED APPLICATION

This application claims the benefit under 35 U.S.C. § 119(a) of a Korean patent application filed on Jan. 10, 2023 in the Korean Intellectual Property Office and assigned Serial number 10-2023-0003684, a Korean patent application filed on May 3, 2023 in the Korean Intellectual Property Office and assigned Serial number 10-2023-0057648, and a Korean patent application filed on Sep. 22, 2023 in the Korean Intellectual Property Office and assigned Serial number 10-2023-0127390, the entire disclosure of which is hereby incorporated by reference.

TECHNICAL FIELD

The present disclosure relates to a vehicle data managing server, a platform managing server and a service server, and a service providing system associated with an autonomous driving platform.

BACKGROUND

As a demand for an eco-friendly vehicle increases, electric vehicles (EVs) using batteries such as a lithium-ion secondary batteries as an energy source are rapidly replacing conventional internal combustion engine vehicles. As artificial intelligence technology and various sensor technologies are advanced, research and development for improving the performance of hardware and software related to autonomous driving systems are also being actively conducted.

Simulation technology is used to improve the performance of such software related to autonomous driving systems. With such simulation technology, an autonomous driving software developer can, for example, set various autonomous driving situations and/or driving conditions and design an appropriate driving strategy to the driving situations and/or driving conditions within a virtual environment. The designed driving strategy may be implemented in autonomous driving software, thereby advancing autonomous driving systems.

In order to further advance the goal of autonomous driving systems of electric vehicles to reduce or eliminate the emission of greenhouse gasses and thereby mitigate the effects of climate change, vehicle energy management is very important. That is, processes of determining various behaviors and driving scenarios may occur in a simulation process for the advancement of an autonomous driving process of the vehicle, and these processes are inevitably closely related to energy consumption or energy management. However, in a case of a general autonomous driving platform, an energy management function is not equipped or an energy management aspect is not considered at all.

SUMMARY

An aspect of the present disclosure is to provide a vehicle data managing server, a platform managing server, and a service server, and a service providing system associated with an autonomous driving platform that enable the provision of an autonomous driving simulation platform equipped with energy management functions. The energy management functions may facilitate more economical driving by the autonomous driving platform as compared to a conventional autonomous vehicle, which in turn may further improve the overall energy efficiency of the vehicle, thereby leading to reduced energy use. Furthermore, the energy management functions can be implemented in the automated vehicle platforms of many types of vehicles, leading to widespread improvements in energy efficiency.

In some examples, the platform managing server may be configured to manage a simulation platform that provides a simulation related to a driving environment of a vehicle, the vehicle data managing server may be configured to acquire vehicle data including driving data related to driving of the vehicle and battery data related to a state of a battery of the vehicle and provide a simulation request to the platform managing server based on the vehicle data and the vehicle data, and the service server may be configured to manage energy management software, wherein the service server is configured to provide the energy management data to the platform managing server.

In some examples, the energy management data may include at least one of diagnostic data obtained by diagnosing the state of the battery of the vehicle, lifespan data obtained by analyzing a lifespan of the battery, first control data for controlling an operation of the battery, usage guide data of the battery, or second control data for controlling driving operations of the vehicle or an electrical module of the vehicle.

In some examples, the energy management data may include the lifespan data, and the service server may be configured to manage the energy management software to receive the vehicle data, acquire regenerative braking information of the vehicle using the vehicle data, derive the lifespan data from the obtained regenerative braking information, and provide the lifespan data to the simulation platform.

In some examples, the vehicle data used to acquire the regenerative braking information may include a vehicle velocity and battery state of charge.

In some examples, the service server may be configured to manage the energy management software to analyze the lifespan of the battery such that the lifespan of the battery is determined to decrease as a count of regenerative braking occurrences included in the regenerative braking information of the vehicle increases.

In some examples, the service server may be configured to manage the energy management software to derive the lifespan of the battery based further on driving mode information included in the vehicle data.

In some examples, the energy management data may include first control data that controls a venting operation of the battery, and the service server may be configured to manage the energy management software to generate the first control data in response to a time to collision (TTC) of the vehicle included in the vehicle data being less than or equal to a threshold value.

In some examples, the energy management data may include second control data that controls an operation priority or an operation cycle of a sensor module mounted on the vehicle, and the service server may be configured to manage the energy management software to generate the second control data based on the battery data included in the vehicle data.

In some examples, the platform managing server may be configured to generate a virtual environment corresponding to the vehicle data in response to the simulation request.

In some examples, the platform managing server may be configured to perform an autonomous driving simulation in the virtual environment, collect simulation data during the performance of the simulation, and update autonomous driving software based on the simulation data, the energy management data, or both.

In some examples, the platform management server may be configured to transmit the updated autonomous driving software to at least one of the vehicle or the vehicle data managing server.

In some examples, the platform managing server may be configured to transfer the vehicle data to the service server in response to (i) an update request for the energy management software or (ii) a determination that the vehicle data matches one or more energy management services.

In some examples, energy management services may include at least one of a battery condition diagnosis, a battery lifespan prediction, or provision of a battery usage guide.

In some examples, the service server may be configured to: update the energy management software using the vehicle data received from the platform management server; and provide the updated energy management software to the platform management server.

Another aspect of the present disclosure is to provide a method that includes: managing, by a platform management server, a simulation platform that provides a simulation related to a driving environment of a vehicle; acquiring, by a vehicle data managing server, vehicle data including driving data related to driving of the vehicle and battery data related to a state of a battery of the vehicle; providing, by the vehicle data managing server, a simulation request to the platform managing server based on the vehicle data and the vehicle data; and managing, by a service server, energy management software, wherein the service server is configured to provide the energy management data to the platform management server.

In some examples, the energy management data may include at least one of diagnostic data obtained by diagnosing the state of the battery of the vehicle, lifespan data obtained by analyzing a lifespan of the battery, first control data for controlling an operation of the battery, usage guide data of the battery, or second control data for controlling driving operations of the vehicle or an electrical module of the vehicle In some examples, the energy management software may provide one or more energy management services including at least one of a battery condition diagnosis, a battery lifespan prediction, or provision of a battery usage guide.

In some examples, the energy management data may include lifespan data, and the method may further involve: managing, by the service server, the energy management software to receive the vehicle data, the vehicle data being used to acquire the regenerative braking information includes a vehicle velocity and battery state of charge, acquiring, by the service server, regenerative braking information of the vehicle using the vehicle data; deriving, by the service server, the lifespan data from the obtained regenerative braking information; and providing, by the service server, the lifespan data to the simulation platform.

In some examples, the method may further involve managing, by the service server, the energy management software to at least one of: analyze the lifespan of the battery such that the lifespan of the battery is determined to decrease as a count of regenerative braking occurrences included in the regenerative braking information of the vehicle increases, derive the lifespan of the battery based further on driving mode information included in the vehicle data, generate first control data controlling a venting operation of the battery in response to a time to collision (TTC) of the vehicle included in the vehicle data being less than or equal to a threshold value, or generate second control data controlling an operation priority or an operation cycle of a sensor module mounted on the vehicle, wherein the second control data based on the battery data included in the vehicle data.

In some examples, the method may further involve: generating, by the platform managing server, a virtual environment corresponding to the vehicle data in response to the simulation request; performing, by the platform managing server, an autonomous driving simulation in the virtual environment; collecting, by the platform managing server, simulation data during the performance of the simulation; and updating, by the platform managing server, autonomous driving software based on the simulation data, the energy management data, or both.

In some examples, the method may further involve transferring, by the platform managing server, the vehicle data to the service server in response to (i) an update request for the energy management software or (ii) a determination that the vehicle data matches one or more energy management services, including at least one of: a battery condition diagnosis, a battery lifespan prediction, or provision of a battery usage guide.

In some examples, the method may further involve: updating, by the service server, the energy management software using the vehicle data received from the platform management server; and providing, by the service server, the updated energy management software to the platform management server.

Additional aspects of the present disclosure are to provide any one or combination of two of the vehicle data managing server, the platform managing server, and the service server described herein. Yet another aspect of the present disclosure is to provide a method of operation for any one or combination of two of the vehicle data managing server, the platform managing server, and the service server as described herein. Yet a further aspect of the present disclosure is to provide a non-transitory computer-readable medium having programmed thereon instructions for executing any of the aforementioned methods associated with any one, combination of two, or all three of the vehicle data managing server, the platform managing server, and the service server as described herein. Yet a further aspect of the present disclosure is to provide the aforementioned servers with a service providing system associated with an autonomous driving platform that can timely update energy management software associated with a simulation platform to more accurately simulate a state of a battery of an autonomous driving vehicle.

The technical problems addressed by the embodiments disclosed in this disclosure are not limited to the example technical problems mentioned herein, as other technical problems known in the art, although not mentioned explicitly in the present disclosure, will be clearly understood by those skilled in the art from the descriptions herein.

In accordance with an aspect of the present disclosure, a service providing system associated with a simulation platform is provided. The service providing system includes a platform managing server configured to manage the simulation platform that provides a simulation related to a driving environment of a vehicle, a vehicle data managing server configured to acquire vehicle data including driving data related to driving of the vehicle and battery data related to a state of a battery of the vehicle and provide a simulation request based on the vehicle data and the vehicle data to the simulation platform, and a service server configured to manage energy management software that provides energy management data to the simulation platform in association with the simulation platform.

In accordance with an aspect of the present disclosure, a vehicle data managing server is provided. The vehicle data managing server includes a communication module, a processor, and a memory for storing instructions, wherein the instructions are configured to, when executed by the processor, cause the vehicle data managing server to acquire, through the communication module, vehicle data including driving data related to driving of a vehicle and battery data related to a state of a battery of the vehicle, and provide, through the communication module, a simulation request based on the vehicle data and the vehicle data to a simulation platform that provides a simulation related to a driving environment of the vehicle managed by a platform managing server.

In accordance with an aspect of the present disclosure, a platform managing server is provided. The platform managing server includes a communication module, a processor, and a memory for storing a simulation platform that provides a simulation related to a driving environment of a vehicle and instructions, wherein the instructions are configured to, when executed by the processor, cause the platform managing server to receive, through the communication module, vehicle data including driving data related to driving of the vehicle and battery data related to a state of a battery of the vehicle from a vehicle data managing server related to the vehicle, and transmit, through the communication module, the vehicle data to a service server that manages energy management software, based on a simulation request based on the vehicle data.

In accordance with an aspect of the present disclosure, a service server is provided. The service server includes a communication module, a processor, and a memory for storing energy management software associated with a simulation platform that provides a simulation related to a driving environment of a vehicle and instructions, wherein the instructions are configured to, when executed by the processor, cause the service server to receive, through the communication module, vehicle data including driving data related to driving of the vehicle and battery data related to a state of a battery of the vehicle from a platform managing server that manages the simulation platform, and provide, through the communication module, energy management data, which is based on the vehicle data, generated using the energy management software to the simulation platform.

DETAILED DESCRIPTION

Figure 1:
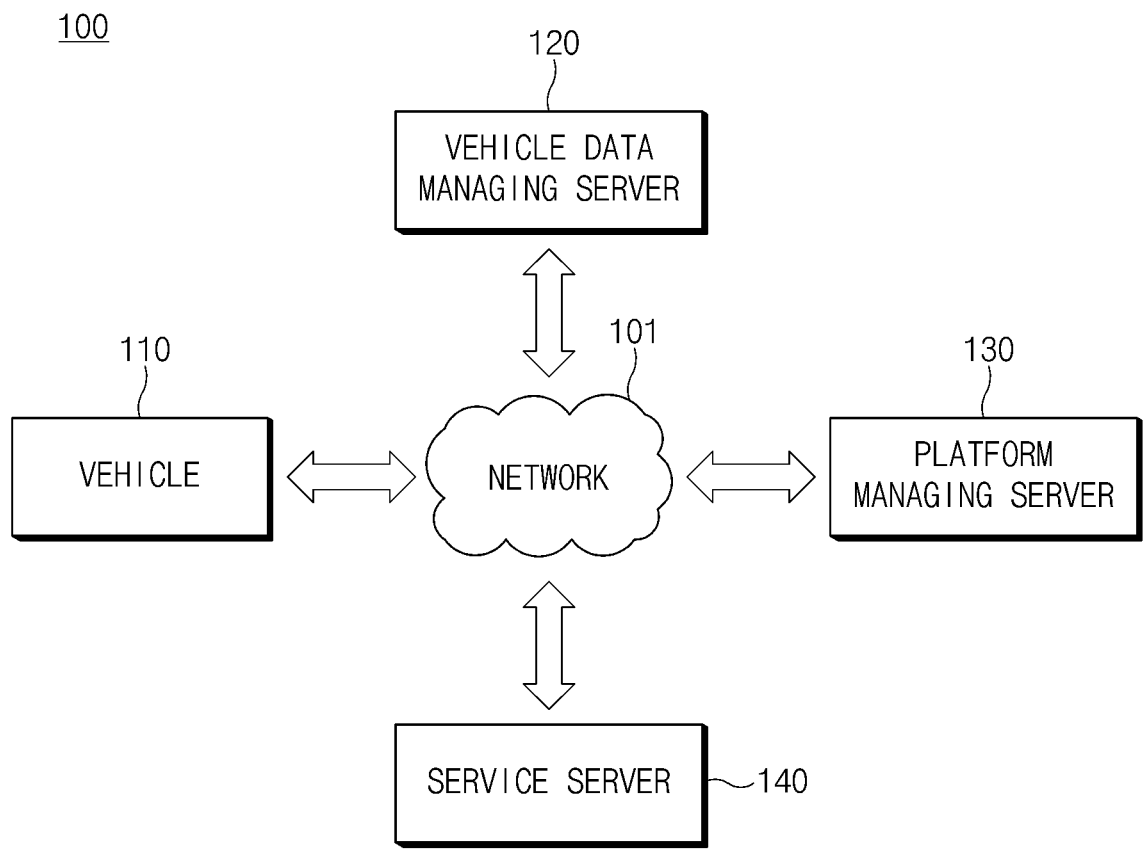
FIG. 1 is a block diagram schematically illustrating a configuration of an energy management service providing system according to some embodiments.

According to the embodiments of the present disclosure, the autonomous driving simulation platform provided by the platform managing server may enable autonomous driving simulation considering an energy management aspect of the vehicle based on energy management software provided or updated by the service server.

According to the embodiments of the present disclosure, the platform managing server can provide the autonomous driving simulation platform associated with the energy management software provided or updated by the service server, and thus improve the performance and competitiveness of the simulation platform.

According to the embodiments of the present disclosure, the service server can update the energy management software through vehicle data acquired from the vehicle, vehicle data managing server, and/or platform managing server, thereby providing an energy management service having high accuracy and improved performance.

In addition, various effects directly or indirectly identified through this disclosure may be provided.

Hereinafter, various embodiments of the present disclosure will be described with reference to the accompanying drawings. However, this is not intended to limit the present disclosure to specific embodiments, and should be understood to include various modifications, equivalents, and/or alternatives of the embodiments of the present disclosure.

Various embodiments of this disclosure and terms used therein are not intended to limit the technical features described in this disclosure to specific embodiments, and should be understood to include various modifications, equivalents, or alternatives of the embodiments. In relation to the description of the drawings, similar reference numerals may be used for similar or related components. The singular form of a noun corresponding to an item may include one item or a plurality of items, unless the relevant context clearly dictates otherwise.

In this disclosure, each of phrases such as "A or B", "at least one of A and B", "at least one of A or B", "A, B or C", "at least one of A, B and C", and "at least one of A, B, or C" may include any one of items listed together in the corresponding phrase among those phrases, or all possible combinations of the items. Terms such as "first", "second", "firstly", "secondly", "A", "B", "(a)" or "(b)" may simply be used to distinguish a corresponding component from other corresponding components, and unless specifically stated to the contrary, do not limit the corresponding components in other respects (e.g., importance or order).

In this disclosure, if a certain (e.g., first) element is referred to as being "linked", "combined", "accessed", or "connected" or "coupled" with or without the terms "functionally" or "communicatively" to another (e.g., second) component, it means that the certain component can be connected to the other component directly (e.g., in a wired manner), wirelessly, or through a third component.

According to some embodiments, a method according to various embodiments disclosed in this disclosure may be provided by being included in a computer program product). The computer program product may be traded between a seller and a buyer as a commodity. The computer program product may be distributed in the form of a device-readable storage medium (e.g., compact disc read only memory (CD-ROM)), or may be distributed (e.g., downloaded or uploaded) online, through an application store or directly between two user devices. In the case of online distribution, at least part of the computer program product may be temporarily stored or tentatively generated in the device-readable storage medium such as a memory of a manufacturer's server, application store server, or relay server.

According to various embodiments, each component (e.g. module or program) of the components described herein may include one or a plurality of entities, and some of the plurality of entities may be separately disposed in other components. According to various embodiments, one or more components among the components described herein or operations may be omitted, or one or more other components or operations may be added. Alternatively or additionally, a plurality of components (e.g., modules or programs) may be integrated into one component. In this case, the integrated component may perform one or more functions of each component of the plurality of components identically or similarly to those functions performed by a corresponding component among the plurality of components prior to the integration. According to various embodiments, operations performed by modules, programs, or other components may be executed sequentially, in parallel, iteratively, or heuristically, or one or more of the operations may be executed in a different order or omitted, or, one or more other operations may be added.

FIG. 1 is a block diagram schematically illustrating a configuration of an energy management service providing system 100 according to some embodiments.

Referring to FIG. 1, the energy management service providing system 100 may include a vehicle 110, a vehicle data managing server 120, a platform managing server 130, and/or a service server 140.

According to some embodiments, the vehicle 110, the vehicle data managing server 120, the platform managing server 130, and the service server 140 may be connected to each other in a wired manner and/or wirelessly through a network 101.

A type of the network 101 is not limited as long as it supports communication between the vehicle 110, the vehicle data managing server 120, the platform managing server 130, and the service server 140.

According to some embodiments, the network 101 may include a wired network, a wireless network, or a combination thereof. In some embodiments, the wired network may include a short-range or wide area Internet supporting the TCP/IP protocol. In some embodiments, the wireless network may include a base station-based wireless communication network, a satellite communication network, a short-range wireless communication network such as Wi-Fi, or a combination thereof.

According to some embodiments, the network 101 may include second generation (2G) to fifth generation (5G) networks, a long term evolution (LTE) network, a global system for mobile communication (GSM) network, a code division multiple accesses (CDMA) network, an evolution-data optimization (EVDO) network, a public land mobile network, and/or other networks.

According to some embodiments, the network 101 may include a local area network (LAN), a wireless local area network (WLAN), a wide area network, a metropolitan network (MAN), a public switched telephone network (PSTN), an ad hoc network, a managed IP network, a virtual private network, an intranet, the Internet, an optical fiber-based network, and/or a combination thereof, or other types of networks.

The vehicle 110 may be an electric vehicle using electrical energy. According to some embodiments, the vehicle 110 may be a vehicle sold by an operating entity of the vehicle data managing server 120 or a test vehicle managed by the operating entity. Here, the test vehicle is a vehicle that is traveled in order to test an autonomous driving function, and may include a vehicle that collects data while driving under various driving environments and constraints.

Hereinafter, the vehicle 110 of FIG. 1 will be described in detail with reference to FIGS. 2 to 6.

Figure 2A:
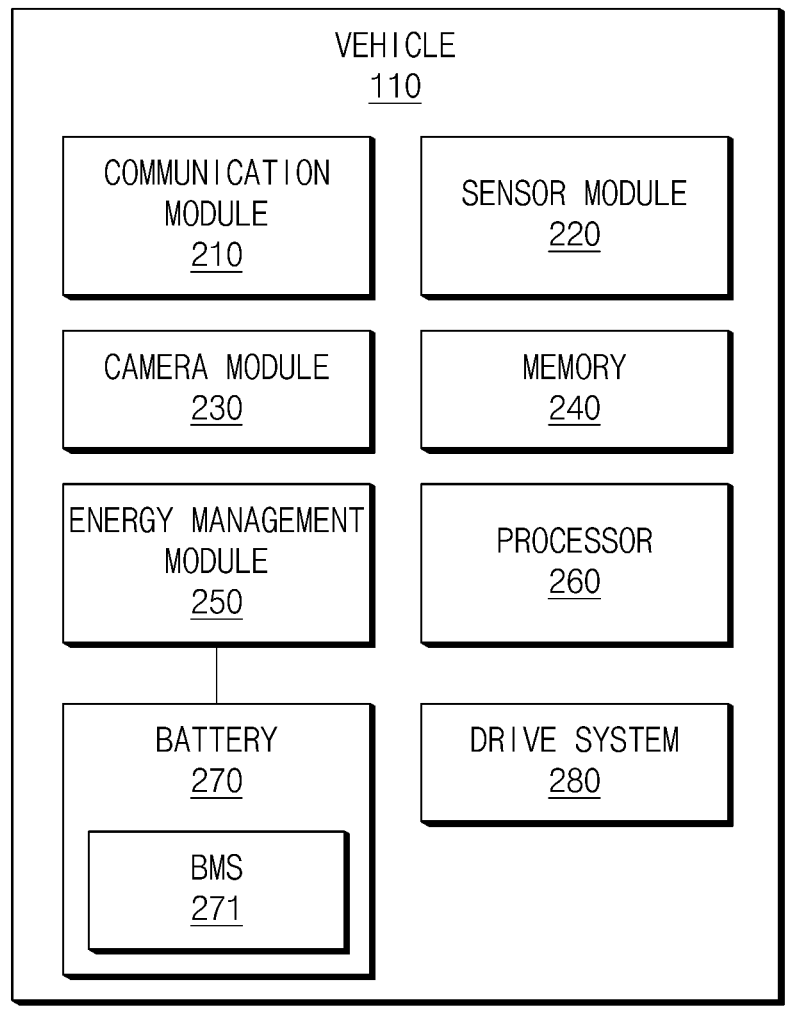
FIGS. 2A to 2C are block diagrams schematically illustrating a configuration of a vehicle according to some embodiments.
Figure 2B:
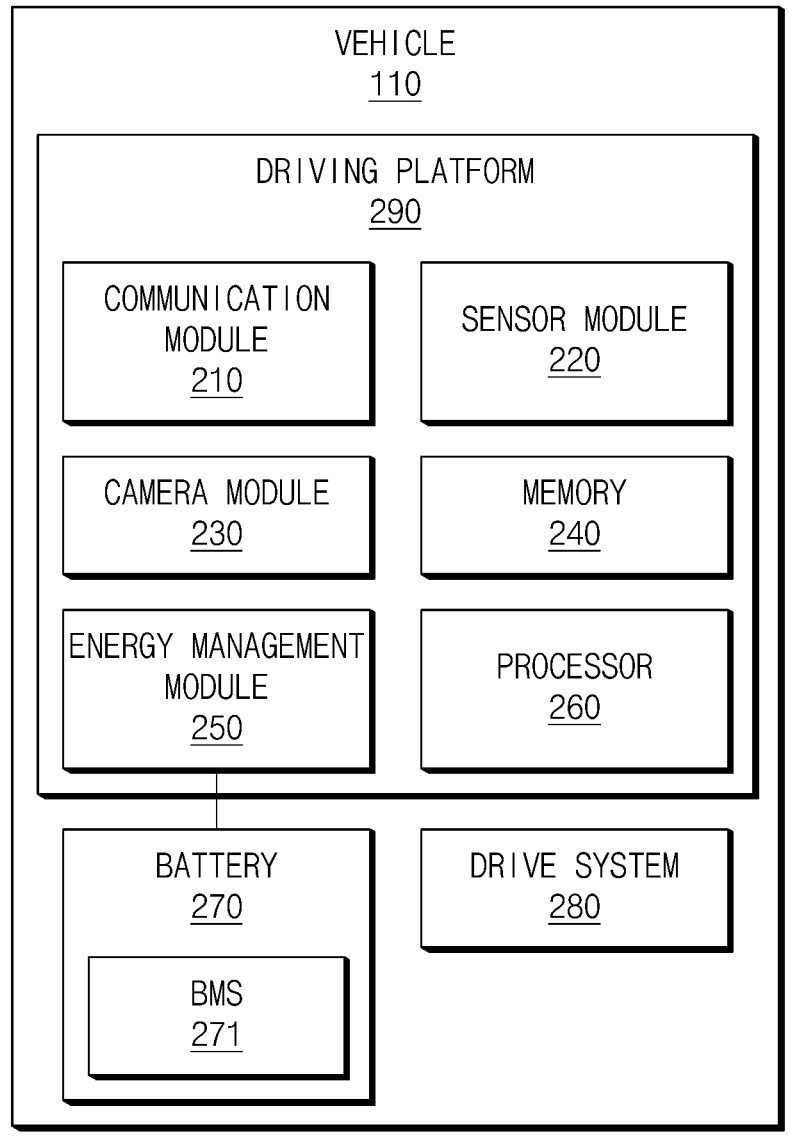
Figure 2C:
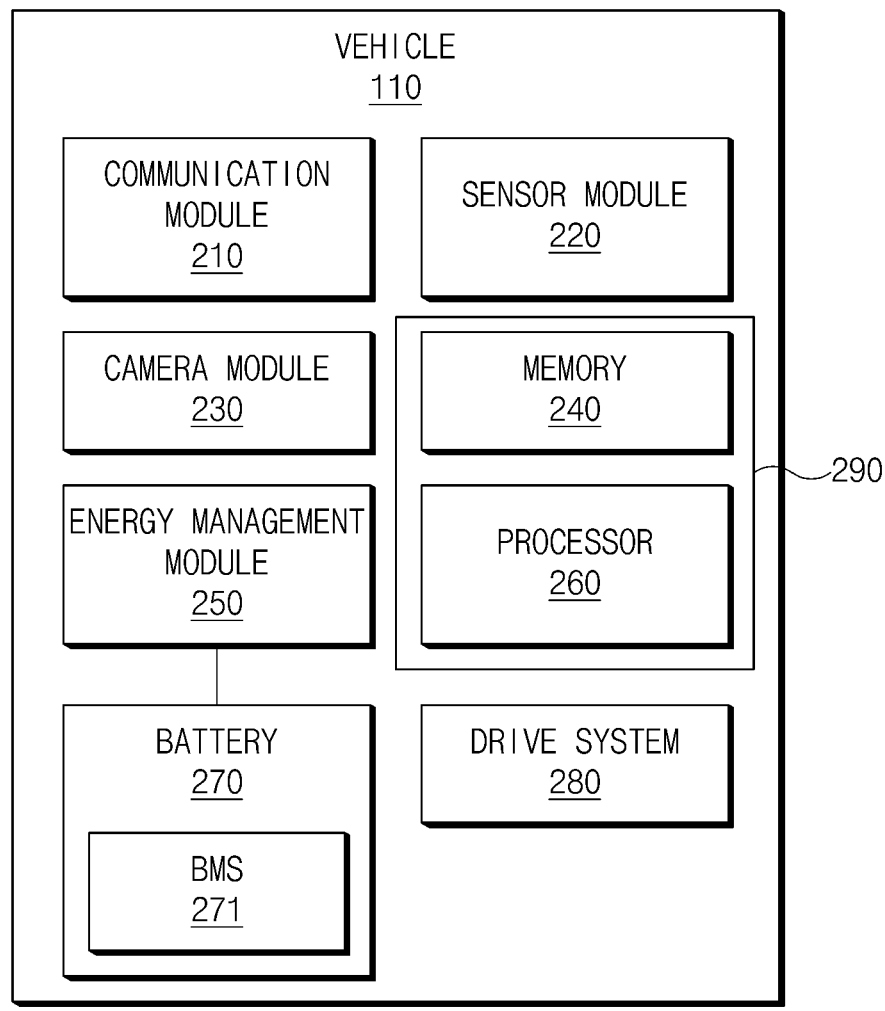
Figure 3:
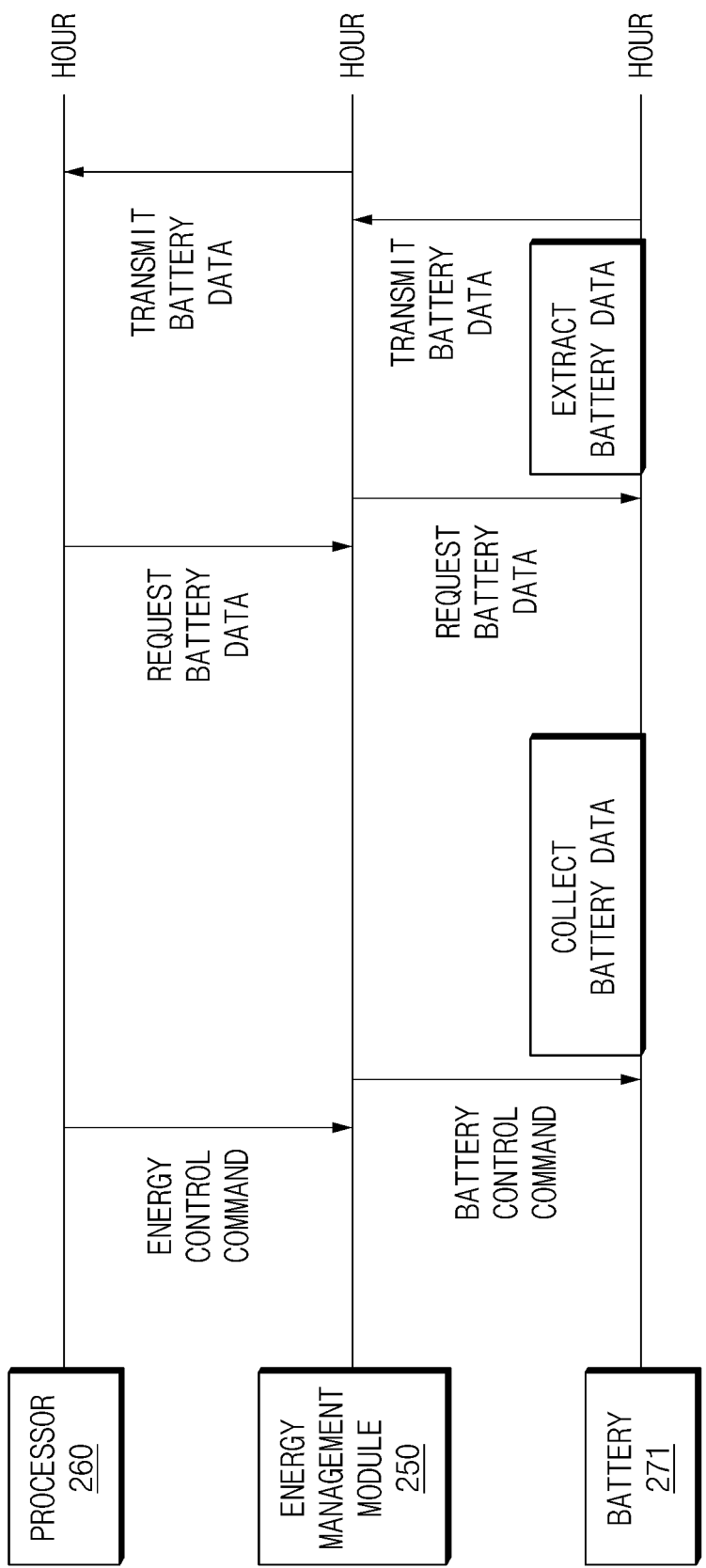
FIGS. 3 and 4 are diagrams illustrating a process of acquiring driving data and battery data of the vehicle according to some embodiments.
Figure 4:
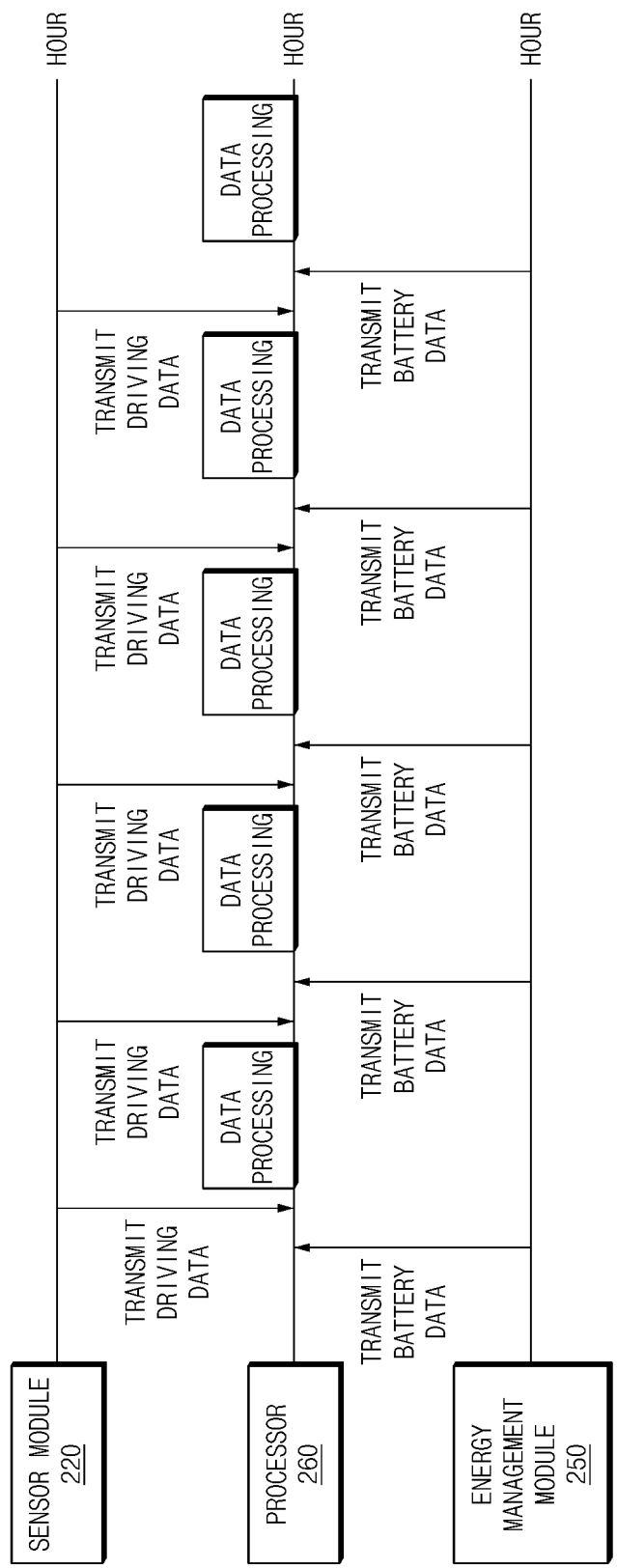
Figure 5:
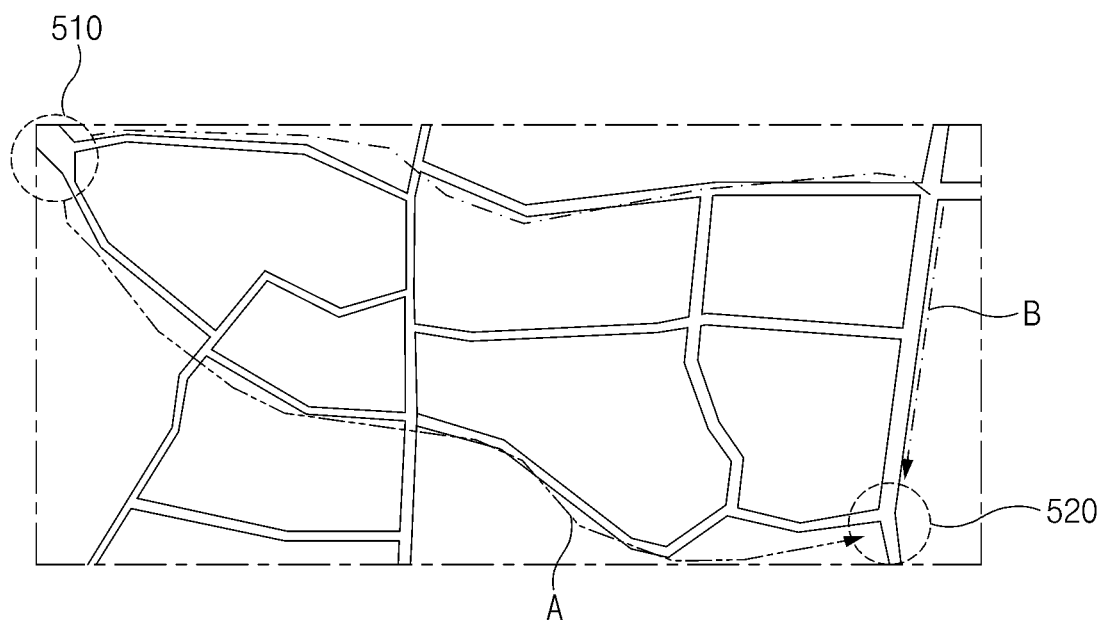
FIGS. 5 and 6 are diagrams for describing association between an autonomous driving platform and energy management software according to some embodiments.
Figure 6:
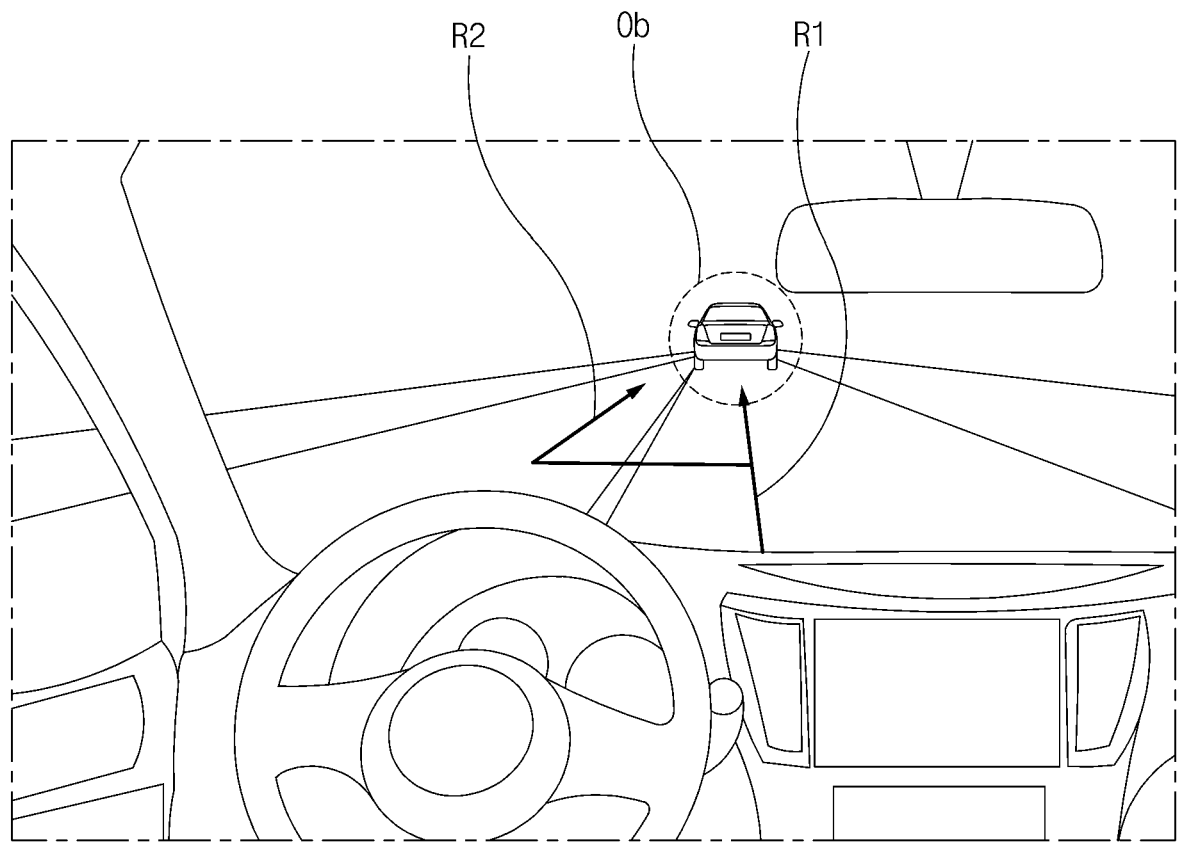

FIGS. 2A to 2C are block diagrams schematically illustrating the configuration of the vehicle 110 according to some embodiments. FIGS. 3 and 4 are diagrams illustrating a process of acquiring driving data and battery data of the vehicle according to some embodiments. FIGS. 5 and 6 are diagrams for describing association between an autonomous driving platform and energy management software according to some embodiments. FIGS. 2A to 2C may be described with reference to configurations of FIG. 1.

Referring to FIG. 2A, the vehicle 110 may include a communication module 210, a sensor module 220, a camera module 230, a memory 240, an energy management module 250, a processor 260, a battery 270, and a drive system 280. According to some embodiments, the vehicle 110 illustrated in FIG. 2A may further include at least one component (e.g., a display, an input device, or an output device) other than the components illustrated in FIG. 2A.

Referring to FIG. 2B and FIG. 2C, at least one component included in the vehicle 110 (e.g., the communication module 210, the sensor module 220, the camera module 230, the memory 240, the energy management module 250, and/or a processor 260) may be implemented as a driving platform 290. For example, as illustrated in FIG. 2B, the communication module 210, the sensor module 220, the camera module 230, the memory 240, the energy management module 250, and the processor 260 may be implemented as the driving platform 290. As another example, as illustrated in FIG. 2C, the memory 240 and the processor 260 may be implemented as the driving platform 290. However, without being limited to the matters described herein, the driving platform 290 may include at least one component of the communication module 210, the sensor module 220, the camera module 230, the memory 240, the energy management module 250, or the processor 260.

According to some embodiments, the driving platform 290 may include at least one of a hardware module (e.g., communication module 210, sensor module 220, camera module 230, memory 240, energy management module 250, and/or processor 260) or software related to driving of the vehicle 110. In addition, the software of the driving platform 210 may be provided to the processor 260 in the form of a System on Chip (SoC), but is not limited thereto.

According to some embodiments, the driving platform 290 may be a configuration provided from an operating entity related to the platform managing server 130.

According to some embodiments, the driving platform 290 may include a general driving platform supporting normal driving of the vehicle 110 and/or an autonomous driving platform supporting autonomous driving of the vehicle 110. Here, the autonomous driving platform may be deployed in level 2 or level 3 or higher autonomous driving vehicles, but is not limited thereto. According to various embodiments, if the driving platform 290 includes the autonomous driving platform, the autonomous driving platform may include autonomous driving software.

According to some embodiments, the communication module 210 may establish a wireless communication channel between the vehicle 110 and the vehicle data managing server 120, and transmit and receive data with the vehicle data managing server 120 through the established wireless communication channel.

According to some embodiments, the communications module 210 may include radio functionality for communicating over 2G to 5G, LTE, GSM, CDMA, EVDO, public land mobile, and/or other wireless protocols. According to some embodiments, the communication module 210 may include the SoC that provides modulation and demodulation functionality and enables the vehicle 110 to communicate through the network 101. According to some embodiments, the communication module 210 may include a radio frequency front end for up-conversion from baseband to radio frequency and down-conversion from radio frequency to baseband.

According to some embodiments, the communication module 210 may transmit vehicle data acquired through at least one component (e.g., sensor module 220, camera module 230, and/or BMS 271) included in the vehicle 110 or stored in the memory 240 to the vehicle data managing server 120 and/or the platform managing server 130. Here, the vehicle data may include driving data related to driving of the vehicle 110 and/or battery data related to a state of a battery (e.g., voltage data, current data, temperature data, and/or state of charge (SOC) data).

According to various embodiments, the vehicle data may include data related to a location of the vehicle 110. In addition, the vehicle data may include a vehicle model code, a vehicle identification code, a battery model code, and/or a battery identification code as data identification information.

According to some embodiments, the communication module 210 may receive data which is related to updating the autonomous driving software stored in the memory 240 from the vehicle data managing server 120. Here, the data related to updating the autonomous driving software may include data related to autonomous driving software updated in an external server (e.g. platform managing server 130) and/or update control. For example, the data related to update control may be data that causes the processor 260 to update the autonomous driving software stored in the memory 240 to the same version as the autonomous driving software updated in the external server.

According to some embodiments, the vehicle 110 may acquire sensor data required in order to perform functions related to autonomous driving through the sensor module 220 and/or the camera module 230.

According to some embodiments, the sensor module 220 may include at least one sensor required for a function related to the autonomous driving of the vehicle 110. For example, the sensor module 220 may include a global navigation satellite system (GNSS) sensors for assisting with mapping, perception, occupancy grid generation, and/or route planning functions, a RADAR sensor for detecting a surrounding vehicle, an ultrasonic sensor for parking assistance and/or occupancy grid generation, a LIDAR sensor for object and pedestrian detection, emergency braking, collision avoidance, and/or other functions, an inertial measurement unit (IMU) sensor including an accelerometer, a magnetometer, a gyroscope, and/or a magnetic compass, a vibration sensor, and/or a velocity sensor.

According to some embodiments, the camera module 230 may include at least one camera required for functions related to autonomous driving of the vehicle 110. For example, the camera module 230 may include a stereo camera, a wide-field camera, an infrared camera, a surround camera, a long-range camera, and/or a mid-range camera.

According to some embodiments, the memory 240 may include a volatile memory and/or a non-volatile memory.

According to some embodiments, the memory 240 may store data acquired by the communication module 210, the sensor module 220, the camera module 230, and/or the BMS 271. According to some embodiments, the memory 240 may store software executed by the processor 260. For example, the software may include autonomous driving software related to the autonomous driving of the vehicle 110.

According to some embodiments, the energy management module 250 may manage energy supplied from an external device to the battery 270 and/or energy supplied from the battery 270 to at least one component of the vehicle 110. For example, the energy management module 250 may convert power supplied from an external device (e.g., a charging device) into power suitable for the battery 270 and transfer the converted power to the battery 270. As another example, the energy management module 250 may convert power transferred from the battery 270 into power suitable for the vehicle 110 and transfer the converted power to at least one component of the vehicle 110.

According to some embodiments, the energy management module 250 may be implemented as at least a part of a power management integrated circuit (PMIC).

According to some embodiments, the processor 260 may control at least one other component of the vehicle 110 connected to the processor 260 and may perform various data processing or operations. According to some embodiments, the processor 260 may include a central processing unit, an application processor, a graphic processing unit, a neural processing unit (NPU), an image signal processor, a sensor hub processor, or a communication processor.

According to some embodiments, the processor 260 may store driving data related to driving of the vehicle 110 in the memory 240. For example, the driving data may include a velocity change profile and traveling distance accumulation profile of the vehicle 110. Optionally, the driving data may further include coordinate data of a moving route of the vehicle 110. The velocity change profile may include a set of velocity data (velocity$_k$, $t_k$). Here, velocity and t are a traveling velocity and a time stamp of the vehicle 110, respectively. Additionally, the velocity change profile may further include acceleration data of the vehicle 110. The traveling distance accumulation profile may include a set ($d_k$, $t_k$) of traveling distance accumulation data according to an accumulated discharge amount of the battery 270. Here, d and t are the accumulated discharge amount, the accumulated traveling distance, and the time stamp, respectively. Optionally, the driving data may include traveling time of the vehicle 110. In addition, the driving data may further include a driving distance of the vehicle 110, vehicle velocity, charger connection information, electrical equipment operation information, and so forth.

In addition, the driving data may further include a rotation change profile of the vehicle 110. The rotation change profile may include a set of velocity data (Steering Angle$_k$, Yaw$_k$, Pitch$_k$, Roll$_k$, t$_k$) according to the SOC of the battery 270. Here, Steering Angle, Yaw, Pitch, Roll and t are a steering angle, vertical rotation, a horizontal rotation, a vertical rotation, and a time stamp of the vehicle 110, respectively.

According to some embodiments, the processor 260 may be electrically connected to the sensor module 220 in order to collect and store the driving data.

According to some embodiments, the processor 260 may store battery data related to the state of the battery 270 in the memory 240 (e.g., voltage data, current data, temperature data, and/or charge state data, SOC, SOH, accumulated charge current amount, accumulated discharge current amount, accumulated charge power amount, accumulated discharge power amount, insulation resistance, relay state data, and so forth). Here, the battery data may be data acquired or calculated by the BMS 271.

According to some embodiments, the processor 260 may be electrically connected to the BMS 271 in order to collect and store the battery data.

Referring to FIG. 3, the processor 260 may collect battery data through the energy management module 250.

According to various embodiments, the processor 260 may transfer an energy control command related to energy management of the battery 270 to the energy management module 250, and the energy management module 250 may transfer a battery control command corresponding to the energy control command to the BMS 271.

The BMS 271 may collect battery data in response to the battery control command and transfer the collected battery data to the energy management module 250. The energy management module 250 which has acquired the battery data may transmit the battery data to the processor 260.

Referring to FIG. 4, the processor 260 may generate vehicle data by processing driving data received from the sensor module 220 and battery data received from the energy management module 250. According to some embodiments, the processor 260 may generate the vehicle data by synchronizing the driving data received from the sensor module 220 and the battery data received from the energy management module 250. This is to increase the accuracy of diagnosis/analysis through the synchronization of driving data and battery data in a process of providing various energy management services related to the battery 270 (e.g., battery state diagnosis, lifespan prediction, provision of usage guide, and so forth) by the energy management software. For example, the processor 260 may generate the vehicle data by synchronizing the driving data and the battery data at a predetermined period, but is not limited thereto.

Referring to FIGS. 2A to 2C again, the processor 260 may control at least one other component of the vehicle 110 connected to the processor 260 (e.g., sensor module 220, camera module 230, energy management module 250, and/or drive system 280) by executing the autonomous driving software stored in the memory 240.

According to some embodiments, the processor 260 may control and/or manage the battery 270 based on energy management software included in the autonomous driving software.

According to some embodiments, the energy management software may provide a state diagnosis service for the battery 270 based on driving data and/or battery data included in vehicle data. For example, the energy management software may analyze the lifespan of the battery 270 in consideration of the voltage, current, temperature, and/or state of charge of the battery 270 included in the battery data.

As another example, the energy management software may analyze the lifespan of the battery 270 by further considering the driving data of the vehicle 110 (e.g. whether or not it is autonomous driving, velocity, acceleration, braking, drive) as well as the battery data.

According to some embodiments, the energy management software may provide an operation control service for the battery 270 according to a driving situation of the vehicle 110. According to some embodiments, the energy management software may determine a driving situation of the vehicle 110 based on driving data of the vehicle 110 (e.g., velocity data, acceleration data, lateral acceleration data, wheel velocity, distance to vehicles in front and behind, time to collision (TTC)). The energy management software may perform operation control of the battery 270 corresponding to the determined driving situation of the vehicle 110. According to some embodiments, the energy management software may generate control data causing the BMS 271 to control the operation of the battery 270.

According to some embodiments, the energy management software may provide a guide for controlling the operation of at least one module included in the vehicle 110 according to the state of the battery 270. Here, the energy management software may provide a guide for controlling whether or not to use at least one sensor included in the sensor module 220 (e.g., GNSS sensor, RADAR sensor, ultrasonic sensor, and/or LIDAR sensor), operation priority thereof, and/or operation cycle thereof in consideration of the state of the battery 270 (e.g., state of charge and/or state of health).

According to some embodiments, the energy management software may provide a service for managing power supplied to the battery 270 when the battery 270 is charged. For example, the energy management software may manage power supplied to the battery 270 based on the diagnosed state of the battery 270.

According to some embodiments, the energy management software may provide a service for managing power output from the battery 270 when the battery 270 is used. For example, the energy management software may manage power output from the battery 270 based on the diagnosed state of the battery 270.

According to some embodiments, the energy management software may generate control data capable of controlling the energy management module 250 to manage input/output power of the battery 270.

According to some embodiments, the energy management software may provide a usage guide of the battery 270 according to the state of the battery 270.

According to some embodiments, the energy management software may provide a driving guide of the vehicle 110 according to the state of the battery 270.

Referring to FIG. 5, the processor 260 may control driving of the vehicle 110 based on autonomous driving software. For example, the processor 260 may determine a driving route according to an execution result of the autonomous driving software. According to some embodiments, the processor 260 may control the vehicle 110 to drive along an optimal driving route selected, from among various driving routes A and B from a starting point 510 to a destination point 520, according to calculation/determination of the autonomous driving software.

In this case, the autonomous driving software may consider an energy management aspect of the vehicle 110 in the process of selecting the optimal driving route among the driving routes A and B. To this end, the autonomous driving software may operate in association with the energy management software.

For example, the autonomous driving software may select the optimal driving route in consideration of a state change of the battery 270 occurring through the driving routes A and B. Here, the state change may include a change in the state of charge and/or the state of health (or lifespan/degree of degradation).

Referring to FIG. 6, the processor 260 may determine a driving strategy of the vehicle 110 according to an execution result of autonomous driving software. For example, the processor 260 may determine the driving strategy of the vehicle 110 according to an execution result of the autonomous driving software and set driving routes R1 and R2 according to the determined driving strategy.

According to some embodiments, when an object Ob is detected in front of the vehicle 110, the processor 260 may control the vehicle 110 to drive along an optimal driving route selected, from among the driving route R1 for slowing down and the driving route R2 for avoiding driving, according to calculation/determination of the autonomous driving software.

In this case, the autonomous driving software may consider the energy management aspect of the vehicle 110 in the process of selecting the optimal driving route among the driving routes A and B. To this end, the autonomous driving software may operate in association with the energy management software. For example, the autonomous driving software may select the optimal driving route in consideration of a state change of the battery 270 occurring through the driving routes R1 and R2. Here, the state change may include a change in the state of charge and/or the state of health.

That is, the driving platform 290 including the processor 260 is required to operate in association with energy management software.

Referring to FIGS. 2A to 2C again, the processor 260 may update the autonomous driving software stored in the memory 240. For example, the processor 260 may receive autonomous driving software updated in an external server (e.g., the platform managing server 130) through the communication module 210. As another example, the processor 260 may receive update software from the external server through the communication module 210. Here, the update software may be software for updating the autonomous driving software stored in the memory 240 to the same version as the autonomous driving software updated in the external server. The processor 260 may update the autonomous driving software stored in the memory 240 based on the update software.

According to some embodiments, the processor 260 may request the vehicle data managing server 120 to update autonomous driving software through the communication module 210, and receive updated autonomous driving software or update software from the vehicle data managing server 120.

According to some embodiments, the battery 270 may be configured as a secondary battery capable of charging and discharging (e.g., a lithium-ion battery). According to some embodiments, the battery 270 may be implemented as a battery pack including a battery module in which a plurality of battery cells are connected in series and/or in parallel. According to various embodiments, the battery 270 may be implemented in a form in which the plurality of battery cells are connected in series and/or in parallel, or implemented as a battery pack (e.g., Cell to Pack) in which the plurality of battery cells are connected in series and/or in parallel.

According to some embodiments, the battery 270 may include the battery management system (BMS) 271 capable of managing and/or controlling the state and operation of the battery 270. In FIGS. 2A to 2C, the BMS 271 is illustrated as being included in the battery 270, but is not limited thereto, and the BMS 271 may manage and/or control the battery 270 in a state of being separated from the battery 270.

According to some embodiments, the BMS 271 may estimate the state of charge of the battery 270 using an ampere counting method, an open circuit voltage (OCV) method, an extended Kalman filter, and so forth. The BMS 271 may include a voltage sensor, a current sensor, and a temperature sensor coupled with the battery 270 in order to collect operating characteristic information of the battery 270.

The drive system 280 may control the operation of actuators related to braking, drive, and posture of the vehicle 110. According to some embodiments, the drive system 280 may include a braking system for controlling an operation of a braking-related actuator, a posture control system for controlling an operation of an actuator for stably maintaining the posture of the vehicle body, a steering system for controlling an operation of an actuator that control the lateral behavior of the vehicle, a shift system for controlling the operation of an actuator for automatic shifting, and/or an engine management system for controlling an operation of an actuator that controls the driving velocity of the vehicle.

Referring to FIG. 1 again, the vehicle data managing server 120 may store and manage the vehicle data and/or the autonomous driving software acquired through the network 101.

Hereinafter, the vehicle data managing server 120 of FIG. 1 will be described in detail with reference to FIG. 7.

Figure 7:
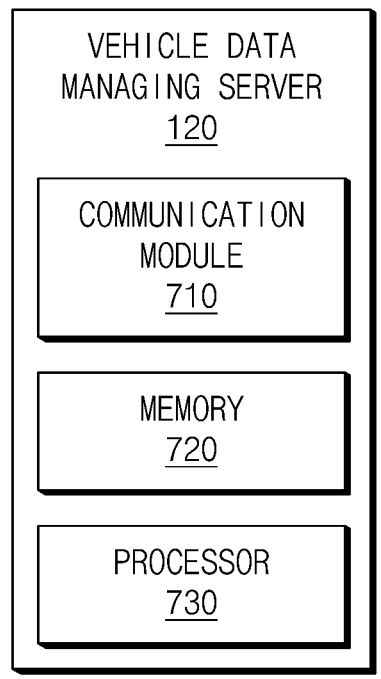
FIG. 7 is a block diagram schematically illustrating a configuration of a vehicle data managing server according to some embodiments.

FIG. 7 is a block diagram schematically illustrating a configuration of the vehicle data managing server according to an exemplary embodiment. FIG. 7 may be described using the configurations of FIG. 1.

According to some embodiments, the vehicle data managing server 120 may include a communication module 710, a memory 720, and a processor 730. Depending on some embodiments, the vehicle data managing server 120 illustrated in FIG. 7 may further include at least one component other than the components illustrated in FIG. 7.

According to some embodiments, the communication module 710 may establish a wired and/or wireless communication channel between the vehicle 110, the platform managing server 130, and/or the service server 140, and transmit and receive data with the vehicle 110, the platform managing server 130, and/or the service server 140 through the established communication channel.

According to some embodiments, the memory 720 may include a volatile memory and/or a non-volatile memory.

According to some embodiments, the memory 720 may store data and/or software received by the communication module 710.

According to some embodiments, the processor 730 may control at least one other component of the vehicle data managing server 120 connected to the processor 730, and may perform various data processing or operations. According to some embodiments, the processor 730 may include a central processing unit, an application processor, a graphics processing unit, a neural network processing unit (NPU), an image signal processor, a sensor hub processor, or a communication processor.

According to some embodiments, the processor 730 may acquire vehicle data from the vehicle 110 through the communication module 710. Here, the vehicle data may include driving data related to driving of the vehicle 110 and/or battery data related to a state of the battery. In addition, the vehicle data may include a vehicle model code, a vehicle identification code, a battery model code, and/or a battery identification code as data identification information.

According to some embodiments, the processor 730 may store the acquired vehicle data in the memory 720.

According to some embodiments, the processor 730 may transmit the vehicle data to the platform managing server 130 or the service server 140 through the communication module 710. In some embodiments, the processor 730 may transmit the vehicle data to the platform managing server 130 or the service server 140 if a predefined event occurs. For example, the predefined event may include a case where the vehicle data managing server 120 receives a vehicle data transmission request, a case where it is determined that an update of autonomous driving software installed in the vehicle 110 is required, and/or a case where a battery mounted on the vehicle 110 is replaced. As another example, the predefined event may include a case where the vehicle 110 arrives at a designated place (e.g., an automobile repair center) and/or a case where the vehicle 110 is connected to a predetermined device (e.g., a charging device).

According to various embodiments, the vehicle data managing server 120 receiving the vehicle data transmission request may involve the vehicle data managing server 120 receiving the vehicle data transmission request from the platform managing server 130. For example, the platform managing server 130 may periodically transfer the vehicle data transmission request to the vehicle data managing server 120 or transfer the vehicle data transmission request to the vehicle data managing server 120 if a version upgrade of autonomous driving software is required.

According to various embodiments, determining that the update of the autonomous driving software installed in the vehicle 110 is required may be in response to a case where a specific error repeatedly occurs while the vehicle 110 is driving, a case where the same abnormal behavior occurs in vehicles 110 driving in a specific section, a case where traffic regulations related to road driving are changed, and so forth.

According to some embodiments, the processor 730 may receive autonomous driving software from the platform managing server 130 through the communication module 710. Here, the received autonomous driving software may be software updated in the platform managing server 130.

According to some embodiments, the processor 730 may receive update software from the platform managing server 130 through the communication module 710. Here, the update software may be software for updating the autonomous driving software to the same version as the autonomous driving software updated in the platform managing server 130.

According to some embodiments, the processor 730 may transmit the received autonomous driving software or update software to the vehicle 110 through the communication module 710. For example, the processor 730 may transmit the autonomous driving software or the update software to the vehicle 110 based on Over the Air (OTA) technology, such as wireless network connections and non-network wireless arrangements. For example, the processor may be connected to a wireless transmitter and/or receiver configured to support communication over any one or combination of wireless protocols, including but not limited to cellular network connections, LTE, 4G, WiFi, GPS, Bluetooth®, Bluetooth LE, or near-field communications.

Referring to FIG. 1 again, the platform managing server 130 may manage autonomous driving software and/or simulation software. According to some embodiments, the platform managing server 130 may provide and/or manage the driving platform 290 disposed in the vehicle 110.

According to some embodiments, the platform managing server 130 may receive an energy management service/energy management function from the service server 140. For example, the service server 140 may provide the energy management service/energy management function to the autonomous driving platform in association with the autonomous driving platform managed by the platform managing server 130. Here, the energy management service may include, but is not limited thereto, a service providing a diagnosis result obtained by diagnosing the state of the battery of the vehicle 110, a service that provides a life analysis result of the battery of the vehicle 110, and/or a service that provides the usage guide of the battery of the vehicle 110, and will be described in more detail herein.

Hereinafter, the platform managing server 130 of FIG. 1 will be described in detail with reference to FIGS. 8, 9A, 9B, and 9C.

Figure 8:
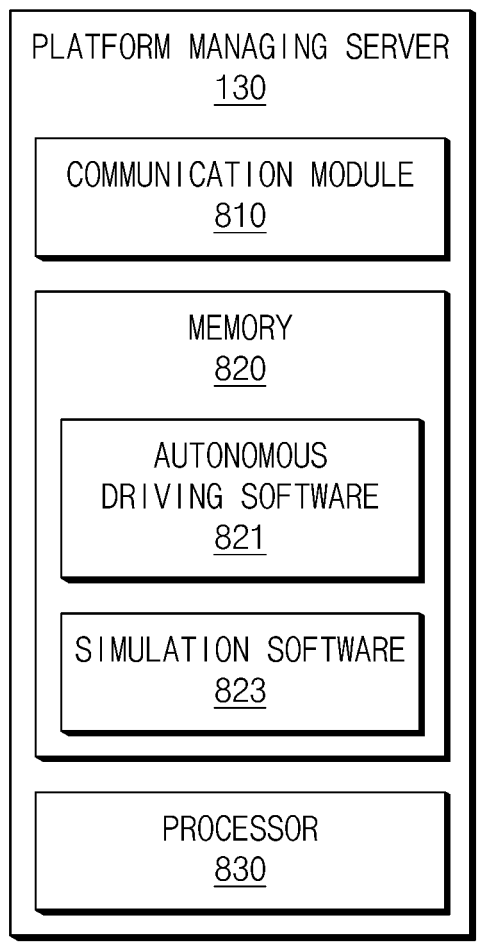
FIG. 8 is a block diagram schematically illustrating a configuration of a platform managing server according to some embodiments.
Figure 9A:
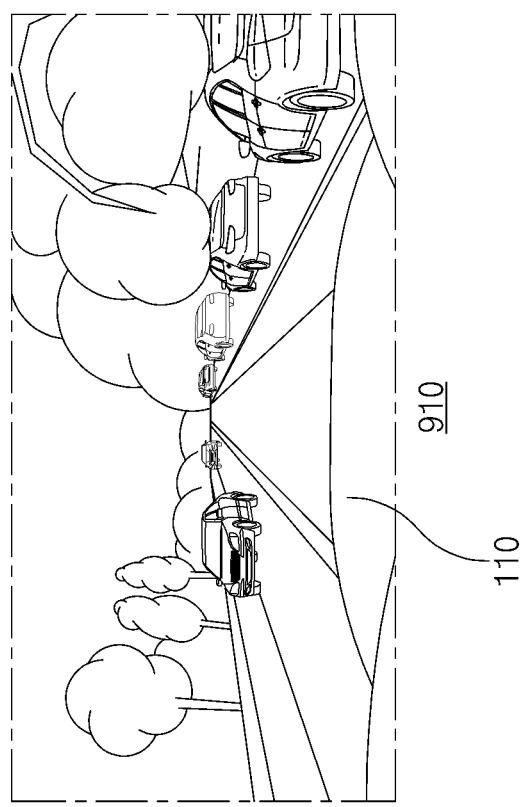
FIGS. 9A to 9C are diagrams for describing an example in which the platform managing server executes a simulation according to some embodiments.
Figure 9A:
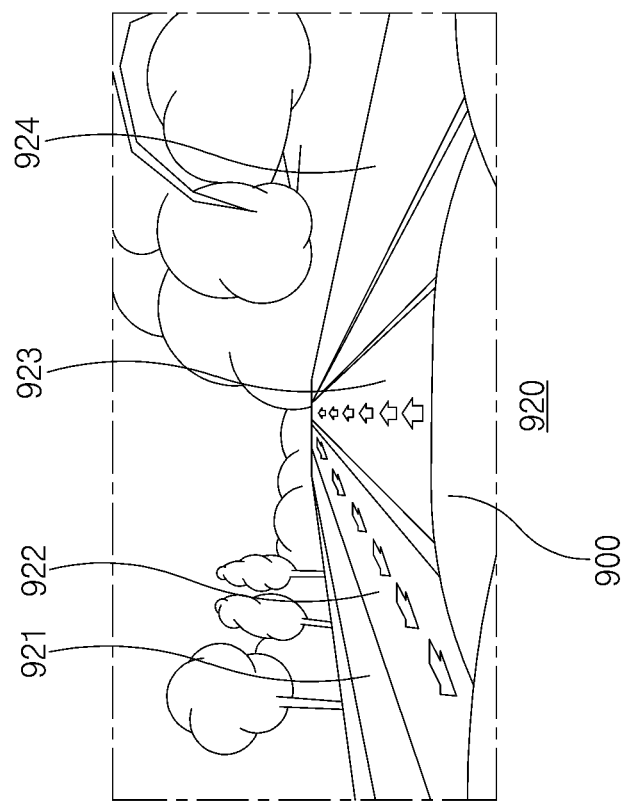
Figure 9B:
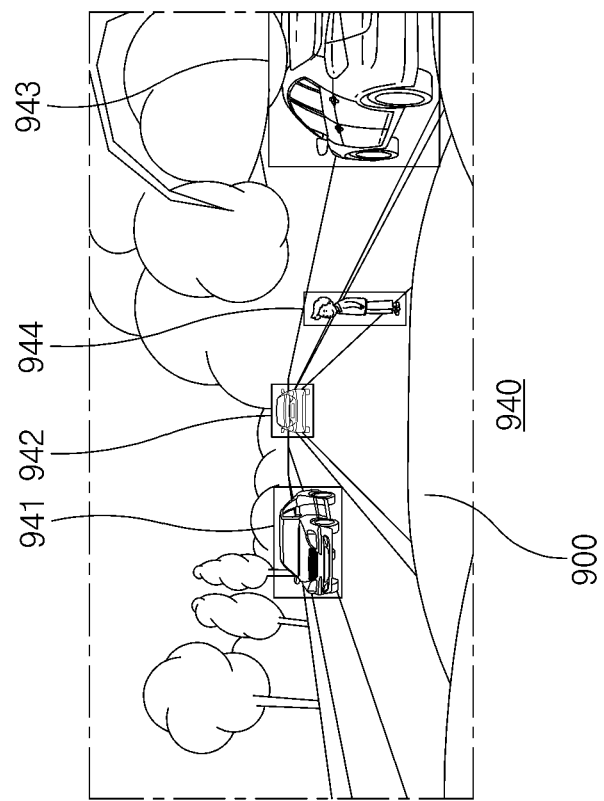
Figure 9B:
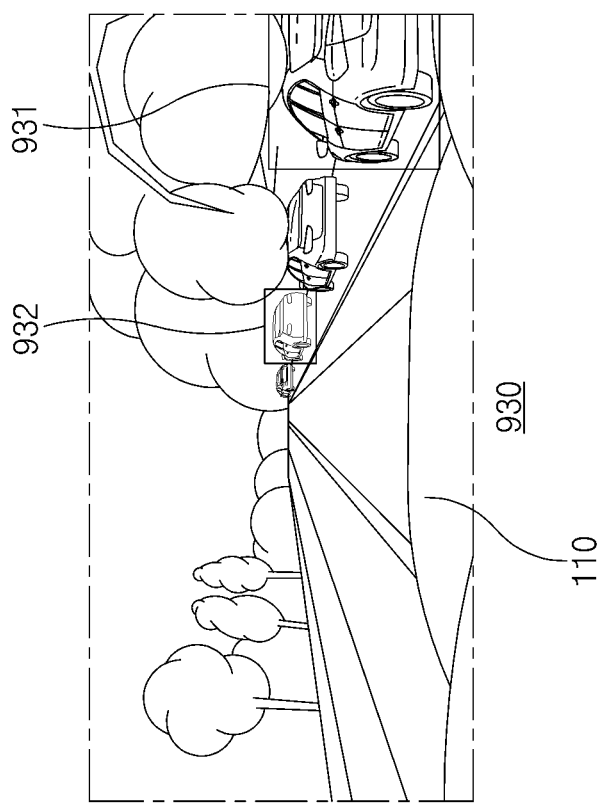
Figure 9C:
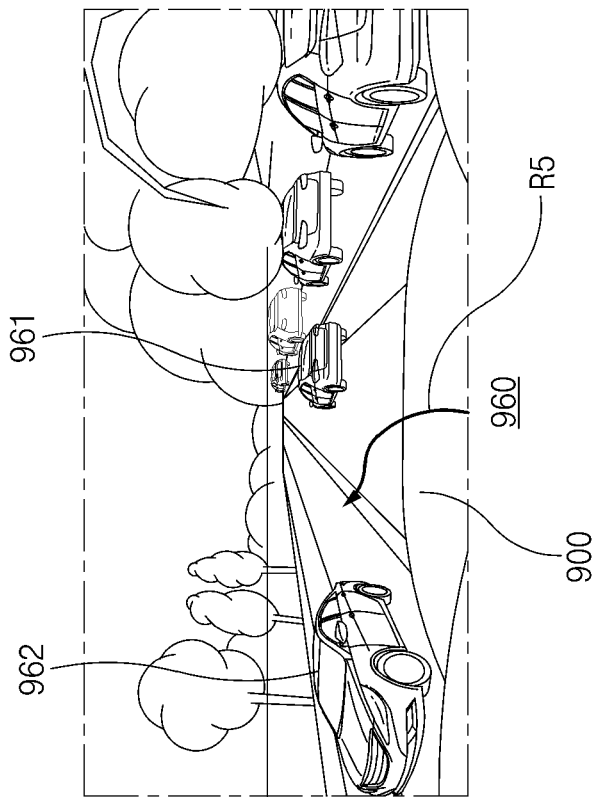
Figure 9C:
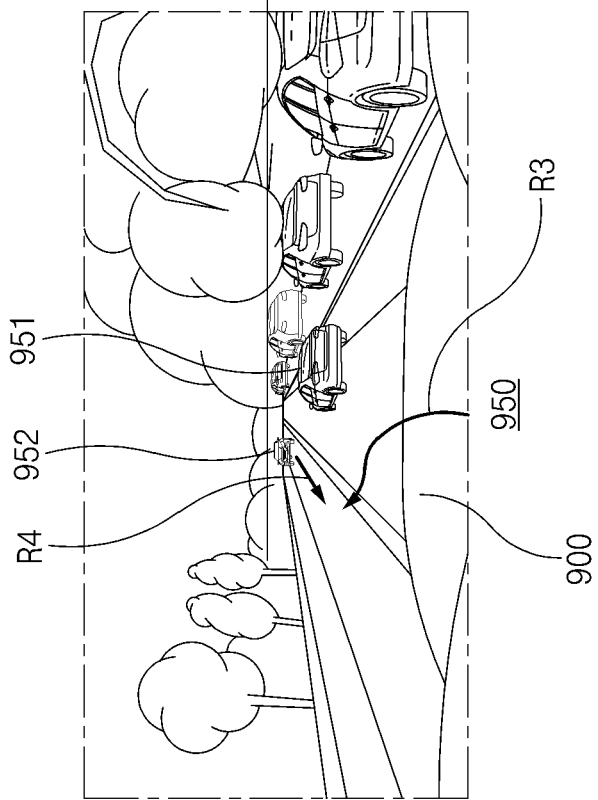

FIG. 8 is a block diagram schematically illustrating a configuration of the platform managing server 130 according to some embodiments. FIGS. 9A to 9C are diagrams for describing an example in which the platform managing server executes a simulation according to some embodiments. FIGS. 8, 9A, 9B, and 9C may be described using the configurations of FIG. 1.

According to some embodiments, the platform managing server 130 may include a communication module 810, a memory 820, and a processor 830. Depending on some embodiments, the platform managing server 130 illustrated in FIG. 8 may further include at least one component other than the components illustrated in FIG. 8.

According to some embodiments, the communication module 810 may establish a wired and/or wireless communication channel between the platform managing server 130 and the vehicle data managing server 120 and/or the service server 140, and transmit and receive data with the vehicle data managing server 120 and/or the service server 140 through an established communication channel.

According to some embodiments, the memory 820 may include a volatile memory and/or a non-volatile memory.

According to some embodiments, the memory 820 may store data received by the communication module 810 and software executed by the processor 830 (e.g., autonomous driving software 821 and simulation software 823).

According to some embodiments, the autonomous driving software 821 may include various software related to autonomous driving of a vehicle or operate in association with various software. For example, the autonomous driving software 821 may operate in association with energy management software related to battery management.

According to some embodiments, the autonomous driving software may include control data capable of controlling the sensor module 220 and/or the camera module 230 disposed in the vehicle 110 in order to collect sensor data required for the autonomous driving of the vehicle 110. In addition, the autonomous driving software may include control data capable of controlling the drive system 280 disposed in the vehicle 110 in order to control drive, braking, velocity conversion, and so forth of the vehicle 110 in response to the collected sensor data.

According to some embodiments, the autonomous driving software 821 may receive control data from the energy management software. Here, the control data may control the energy management module 250 to manage input/output power of the battery 270 disposed in the vehicle 110.

According to some embodiments, the energy management software may be software provided by the service server 140.

According to some embodiments, the simulation software 823 may generate a virtual environment based on vehicle data collected in a physical environment. The simulation software 823 may perform autonomous driving simulation of a vehicle in the generated virtual environment and collect simulation data. Here, the simulation data may include virtual sensor data collected by a virtual sensor of a virtual vehicle implemented in the virtual environment and virtual battery data collected by a virtual BMS of the virtual vehicle.

According to some embodiments, the processor 830 may control at least one other component of the platform managing server 130 connected to the processor 830 and may perform various data processing or operations. According to some embodiments, the processor 830 may include a central processing unit, an application processor, a graphic processing unit, a neural network processing unit (NPU), an image signal processor, a sensor hub processor, or a communication processor.

According to some embodiments, the processor 830 may acquire vehicle data from the vehicle data managing server 120 through the communication module 810. Here, the vehicle data may include driving data related to driving of the vehicle 110 and/or battery data related to a state of the battery. In addition, the vehicle data may include a vehicle model code, a vehicle identification code, a battery model code, and/or a battery identification code as data identification information.

According to some embodiments, the processor 830 may store the acquired vehicle data in the memory 820.

According to some embodiments, the processor 830 may transmit the vehicle data to the service server 140 through the communication module 810. In some embodiments, the processor 830 may transmit the vehicle data to the service server 140 if a predefined event occurs. For example, the predefined event may include a case where it is determined that an update of energy management software included in autonomous driving software stored in the memory 820 is required, a case where it is determined that vehicle data matches with the energy management service provided by the service server 140 is acquired, and/or a case where the platform managing server 130 receives a simulation execution request from the vehicle data managing server 120. In some embodiments, the vehicle data that is determined to match the energy management service provided by the service server 140 may be vehicle type data, such as the type of vehicle or one or more types of components or features of the vehicle.

In the case where vehicle data matches with energy management service is acquired, the processor 830 may immediately transfer vehicle data to the service server 140 vehicle data that is required for one or more energy management services is acquired. In some embodiments, the vehicle data required for analysis/processing in energy management software for each energy management service may be different (for example, vehicle data for each of battery condition diagnosis, battery lifespan prediction, and battery usage guide may be different from each other).

According to some embodiments, the processor 830 may transmit an update request signal of the energy management software to the service server 140 through the communication module 810. The service server 140 may update the energy management software in response to the received vehicle data and update request signal.

According to some embodiments, the processor 830 may receive updated energy management software or first update software from the service server 140 through the communication module 810. Here, the first update software may be software for updating the energy management software included in the autonomous driving software 821 stored in the memory 820 to the same version as the energy management software updated by the service server 140. According to some embodiments, the processor 830 may update the autonomous driving software 821 stored in the memory 820 based on the update software.

According to some embodiments, the processor 830 may transmit the updated autonomous driving software or second update software to the vehicle 110 and/or the vehicle data managing server 120 through the communication module 810. Here, the second update software may be software for updating the autonomous driving software installed in the vehicle 110 to the same version as the autonomous driving software updated by the platform managing server 130.

According to some embodiments, the processor 830 may transmit an energy management data request signal together with the vehicle data to the service server 140 through the communication module 810. Here, the energy management data request signal may be a signal requesting the service server 140 to execute the energy management software based on the vehicle data and to transmit energy management data, which is result data.

According to some embodiments, the processor 830 may execute a simulation based on the vehicle data received from the vehicle data managing server 120 and the simulation software 823 stored in the memory 820. For example, the processor 830 may execute the simulation in response to a simulation execution request received from a terminal of an administrator (e.g. an autonomous driving software developer) of the vehicle data managing server 120 or the administrator of the vehicle data managing server 120.

According to some embodiments, the processor 830 may generate a virtual environment based on vehicle data. Here, the vehicle data may include data related to a location of the vehicle 110, sensor data acquired by a sensor module (e.g., sensor module 220 in FIG. 2A) of the vehicle 110, and camera data acquired by a camera module (e.g., camera module 230 in FIG. 2A) of the vehicle 110. According to some embodiments, the processor 830 may generate a virtual environment reflecting the location and driving situation, and so forth of the vehicle 110 by using the acquired vehicle data and map data pre-stored in the memory 820.

Referring to FIG. 9A, the processor 830 may generate a virtual environment 920 based on vehicle data 910.

According to some embodiments, the vehicle data 910 may include information about the location and the driving situation and so forth of the vehicle 110. Here, the information about the driving situation may include information about the velocity and acceleration of the vehicle 110 and information about objects around the vehicle 110 acquired by the sensor module 220 and/or camera module 230 of the vehicle 110.

According to some embodiments, the processor 830 may generate the virtual environment 920 corresponding to the vehicle data 910 by executing the simulation software 823. Here, the virtual environment 920 may mean an environment in which the virtual vehicle 900 generated based on the vehicle data 910 drives. According to some embodiments, the processor 830 may apply information about a driving direction of roads 922 and 923 on which the vehicle 110 is driving to the virtual environment 920 based on location data of the vehicle 110 included in the vehicle data 910.

According to some embodiments, the processor 830 may apply information about the driving direction of the roads 922 and 923 on which the vehicle 110 is driving and the situation of surrounding environments 921 and 924 to the virtual environment 920 based on surrounding object data of the vehicle 110 included in the vehicle data 910. For example, if vehicles disposed to the right of the vehicle 110 in the vehicle data 910 are in a stopped state, the processor 830 may set the surrounding environment 924 of the virtual environment 920 to an environment in which driving is impossible. As another example, if there is a vehicle driving in a direction opposite to the vehicle 110 on the left side of the vehicle 110 in the vehicle data 910, the processor 830 may set the driving direction of the road 922 in the virtual environment 920 to a direction opposite to the driving direction of the vehicle 110.

Referring to FIG. 9B, the processor 830 may generate a virtual environment 940 based on vehicle data 930.

According to some embodiments, the vehicle data 930 may include information about surrounding objects 931 and 932 of the vehicle 110. For example, the information about the surrounding objects 931 and 932 may be information acquired by a camera module of the vehicle 110.

According to some embodiments, the processor 830 may generate a virtual environment 940 including virtual objects 941, 942, 943, and 944 based on the simulation software 823. Here, the virtual environment 940 may mean an environment in which the virtual vehicle 900 generated based on the vehicle data 930 drives. For example, the processor 830 may generate the virtual objects 941, 942, and 943 corresponding to the surrounding objects 931 and 932 at any location in the virtual environment 940 based on the information about the surrounding objects 931 and 932 acquired through the vehicle data 930. As another example, the processor 830 may generate any virtual object 944 at any location of the virtual environment 940 based on the simulation software 823.

Referring to FIG. 8 again, the processor 830 may perform autonomous driving simulation of the vehicle in the generated virtual environment. The processor 830 may perform the autonomous driving simulation of the vehicle in the virtual environment based on the autonomous driving software 821 stored in the memory 820.

Referring to FIG. 9C, the processor 830 may perform autonomous driving simulation of the virtual vehicle 900 through generated virtual environments 950 and 960.

First, the processor 830 may perform the autonomous driving simulation of the virtual vehicle 900 by using the generated virtual environment 950. According to some embodiments, in the virtual environment 950, a situation in which the virtual vehicle 900 drives along a first route R3 according to the virtual object 951 stopped on the same road may be simulated. In this case, in the virtual environment 950, a situation in which the virtual vehicle 900 collides with a virtual object 952 driving on a second route R4 of which direction is opposite to the driving direction of the vehicle 900 on the left road is simulated. This may be due to the fact that the autonomous driving software 821 executed in the processor 830 is in a trained state to consider only a virtual object driving in the same direction as the virtual vehicle 900.

According to some embodiments, the processor 830 may train the autonomous driving software 821 so that the collision situation is prevented, based on a simulation result in the virtual environment 950. For example, the processor 830 may train the autonomous driving software 821 to consider not only the virtual object driving in the same direction as the virtual vehicle 900 but also a virtual object driving in the opposite direction.

According to some embodiments, the processor 830 may re-execute the autonomous driving simulation of the virtual vehicle 900 through the virtual environment 960 based on the trained autonomous driving software 821. According to some embodiments, in the virtual environment 960, a situation, in which the virtual vehicle 900 stops until the virtual object 962 passes by considering both the virtual object 961 stopped on the same road and the virtual object 962 driving in the direction opposite to the virtual vehicle 900 on the left road, and then drives along the third route R5, may be simulated. In this aspect, the autonomous driving software 821 may be updated through training.

Referring to FIG. 8 again, the processor 830 may perform data processing. Prior to the above operation, the processor 830 may receive energy management data from the service server 140. Here, the energy management data may include result data acquired by the service server 140 executing the energy management software based on the vehicle data, which will be described in more detail herein.

According to some embodiments, the processor 830 may update the autonomous driving software 821 based on simulation data collected through execution of the simulation and/or the energy management data. For example, the processor 830 may update the autonomous driving software 821 through training based on the simulation data. In addition, the platform managing server 130 may update energy management software included in the autonomous driving software 821 based on the energy management data.

According to some embodiments, the processor 830 may perform synthesis and/or pre-processing of the simulation data collected during the simulation and the received energy management data.

According to some embodiments, the processor 830 may transmit final data generated by the synthesis and/or pre-processing to the vehicle data managing server 120 through the communication module 810.

Referring to FIG. 1 again, the service server 140 may provide various energy management services based on the energy management software.

Hereinafter, the service server 140 of FIG. 1 will be described in detail with reference to FIG. 10.

Figure 10:
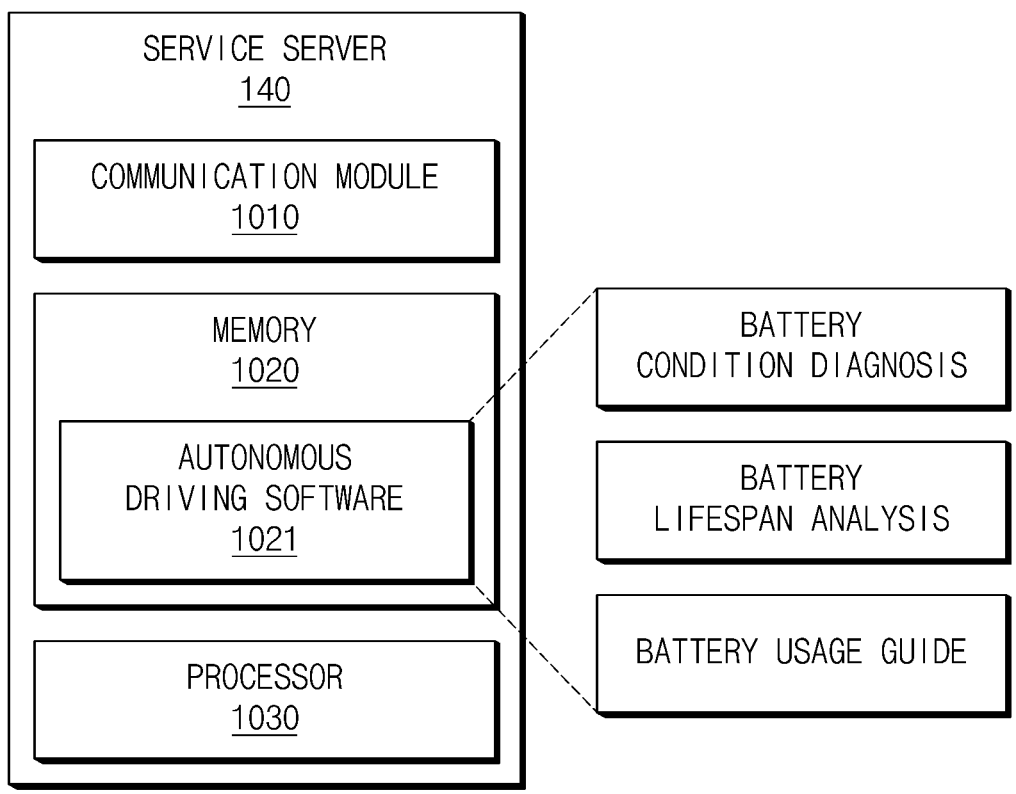
FIG. 10 is a block diagram schematically illustrating a configuration of a service server according to some embodiments.

FIG. 10 is a block diagram schematically illustrating a configuration of the service server 140 according to an exemplary embodiment. FIG. 10 may be described using the configurations of FIG. 1.

Referring to FIG. 10, the service server 140 may include a communication module 1010, a memory 1020, and a processor 1030. Depending on some embodiments, the service server 140 illustrated in FIG. 10 may further include at least one component other than the components illustrated in FIG. 10.

According to some embodiments, the communication module 1010 may establish a wired and/or wireless communication channel between the service server 140 and the vehicle data managing server 120 and/or the platform managing server 130 and transmit and receive data with the vehicle data managing server 120 and/or the platform managing server 130 through the established communication channel.

According to some embodiments, the memory 1020 may include a volatile memory and/or a non-volatile memory.

According to some embodiments, the memory 1020 may include at least one storing unit capable of storing various data included in the vehicle data received by the communication module 1010.

According to some embodiments, the memory 1020 may include a battery identification information storing unit capable of storing a vehicle model code, a vehicle identification code, a battery model code, and/or a battery identification code, and so forth. The type of information stored in the battery identification information storing unit may be added or changed.

According to some embodiments, the memory 1020 may include a driving data storing unit capable of storing the driving data related to driving of the vehicle 110. An area in which the driving data is stored in the driving data storing unit may be assigned to each battery to which a battery identification code is assigned. Here, the driving data may include a velocity change profile and traveling distance accumulation profile of the vehicle 110. In addition, the driving data may further include data related to the location of the vehicle, charger connection information, electrical equipment operation information, and so forth. In addition, the driving data may include the accumulated traveling time for each velocity section, the accumulated traveling time for each traveling region, and/or the accumulated traveling time for each humidity section of the vehicle 110. The type of information stored in the driving data storing unit may be added or changed.

According to some embodiments, the memory 1020 may include a battery data storing unit capable of storing the battery data related to the state of the battery. An area in which battery data is stored in the battery data storing unit may be assigned to each battery to which the battery identification code is assigned. Here, the battery data may include a voltage, current, and/or temperature change profile according to the state of charge of the battery. In addition, the battery data may include the accumulated operating time for each voltage section, the accumulated operating time for each current section, and/or the accumulated operating time for each temperature section of the battery. The type of information stored in the battery data storing unit may be added or changed.

According to some embodiments, the memory 1020 may store energy management software 1021 executed by the processor 1030.

According to some embodiments, the energy management software 1021 may operate in association with the simulation software 823. For example, the energy management software 1021 may provide energy management data to the simulation software 823 if a call related to energy management data is received from the simulation software 823. According to some embodiments, the energy management software 1021 may provide various functions/services related to battery management.

According to some embodiments, the energy management software 1021 may diagnose the state of the battery based on the driving data and/or battery data included in vehicle data.

According to various embodiments, the energy management software 1021 may analyze the lifespan of the battery based on the driving data and/or the battery data of the vehicle. For example, the energy management software 1021 may analyze the lifespan of the battery in consideration of the voltage, current, temperature, and/or state of charge of the battery included in the battery data. As another example, the energy management software 1021 may further analyze the lifespan of the battery by further considering driving data of the vehicle (e.g., whether or not it is autonomous driving, velocity, acceleration, braking, drive) as well as the battery data.

According to various embodiments, the energy management software 1021 may analyze the lifespan of the battery based on regenerative braking information acquired from the driving data of the vehicle. For example, the energy management software 1021 may determine whether an increase in the charge amount of the battery is an increase due to charging through a charger or an increase due to charging through regenerative braking by using the velocity of the vehicle included in the vehicle data and the state of charge/charge amount of included in the battery data. That is, the energy management software 1021 may determine that charging is performed through regenerative braking if the charge amount of the battery increases in a state where the velocity of the vehicle decreases, and may determine that charging is performed through the charger if the charge amount of the battery increases in a state where the velocity of the vehicle is 0.

On the other hand, if the number of regenerative braking increases in the vehicle, the number of charge/discharge times of the battery may increase, which may affect the lifespan of the battery. The energy management software 1021 may increase the accuracy of lifespan analysis by analyzing the lifespan of the battery in consideration of the number of times of regenerative braking determined based on the vehicle data.

In addition, the energy management software 1021 may analyze the lifespan of the battery based on driving mode information included in the vehicle data. Here, the driving mode may include a driver's direct driving mode and an autonomous driving mode. According to various embodiments, the number of times of regenerative braking of the vehicle may be greater in the driver's direct driving mode than in the autonomous driving mode. Accordingly, the energy management software 1021 may increase the accuracy of lifespan analysis by analyzing the lifespan of the battery in consideration of the driving mode of the vehicle.

According to some embodiments, the energy management software 1021 may control the operation of the battery according to the driving situation of the vehicle. According to some embodiments, the energy management software 1021 may determine a driving situation based on driving data of the vehicle (e.g., velocity data, acceleration data, lateral acceleration data, wheel velocity, distance to vehicles in front and behind, time to collision (TTC)). The energy management software 1021 may perform battery operation control corresponding to the determined driving situation of the vehicle. For example, the energy management software 1021 may control a venting operation of the battery in order to prevent a battery safety accident (e.g. fire and/or explosion) if the distance to the vehicle in front is determined to be less than or equal to a predetermined distance or the TTC is less than or equal to a threshold value. According to some embodiments, the energy management software 1021 may generate control data that causes a BMS (e.g., BMS 271 in FIG. 2A) included in a vehicle (e.g., vehicle 110 in FIG. 2A) to control the operation of the battery.

According to some embodiments, the energy management software 1021 may provide a usage guide of the battery according to the state of the battery.

According to some embodiments, the energy management software 1021 may provide a driving guide of the vehicle according to the state of the battery. For example, the energy management software 1021 may provide a driving route guide considering a change in battery state (e.g., state of charge and/or state of health).

As another example, the energy management software 1021 may provide a lateral control guide and/or a longitudinal control guide of the vehicle considering the state of the battery (e.g. state of charge and/or state of health). Here, the lateral control guide of the vehicle may be related to distance control from lanes and/or distance control from left and right vehicles. In addition, the longitudinal guide of the vehicle may be related to distance control with front and rear vehicles.

According to some embodiments, the energy management software 1021 may provide a guide for controlling the operation of at least one module included in the vehicle according to the state of the battery. Here, the energy management software 1021 may provide a guide for controlling whether or not to use of at least one sensor included in the vehicle (e.g., GNSS sensor, RADAR sensor, ultrasonic sensor, and/or LIDAR sensor), an operation priority thereof, and/or an operation cycle thereof in consideration of the state of the battery (e.g. state of charge and/or state of health). For example, if the state of charge of the battery is equal to or less than a fixed level, the energy management software 1021 may change a use priority of a sensor whose power consumption exceeds predetermined power or set an operation cycle of the sensor to be greater than or equal to a predetermined period. As another example, the energy management software 1021 may set the operation priority, the operation cycle, and so forth of at least one sensor so that a deterioration rate of the battery is minimized, in consideration of a health state of the battery.

According to some embodiments, the energy management software 1021 may manage power supplied to the battery when the battery is charged. For example, the energy management software 1021 may manage the power supplied to the battery based on the diagnosed state of the battery.

According to some embodiments, the energy management software 1021 may manage power output from the battery when the battery is used. For example, the energy management software 1021 may manage the power output from the battery based on the diagnosed state of the battery. According to some embodiments, the energy management software 1021 may include control data capable of controlling an energy management module (e.g., the energy management module 250 in FIG. 2) to manage input/output power of the battery.

According to some embodiments, the processor 1030 may control at least one other component of the service server 140 connected to the processor 1030 and may perform various data processing or operations. According to some embodiments, the processor 1030 may include a central processing unit, an application processor, a graphic processing unit, a neural network processing unit (NPU), an image signal processor, a sensor hub processor, or a communication processor.

According to some embodiments, the processor 1030 may receive vehicle data from the vehicle data managing server 120 or the platform managing server 130 through the communication module 1010. Here, the vehicle data may include driving data related to driving of the vehicle 110 and/or battery data related to a state of the battery. In addition, the vehicle data may include a vehicle model code, a vehicle identification code, a battery model code, and/or a battery identification code as data identification information.

According to some embodiments, the processor 1030 may store the acquired vehicle data in the memory 1020.

According to some embodiments, the processor 1030 may receive an update request signal of the energy management software 1021 together with the vehicle data from the vehicle data managing server 120 or the platform managing server 130 through the communication module 1010.

According to some embodiments, the processor 1030 may update the energy management software 1021 stored in the memory 1020 in response to the update request signal.

According to some embodiments, the processor 1030 may update the energy management software 1021 based on the vehicle data. According to some embodiments, the battery state diagnosis software may diagnose the degree of degradation of the battery using an artificial intelligence model. Here, the artificial intelligence model is a software algorithm coded in a programming language and may be an artificial neural network. In this case, the processor 1030 may update the energy management software 1021 by additionally training the artificial intelligence model based on the vehicle data.

According to some embodiments, the processor 1030 may transmit the updated energy management software 1021 or first update software to the platform managing server 130 through the communication module 1010. Here, the first update software may be software for updating the energy management software included in autonomous driving software (e.g. autonomous driving software 821) stored in the memory (e.g. memory 820) of the platform managing server 130 to the same version as the energy management software updated by the service server 140.

According to some embodiments, the processor 1030 may receive an energy management data request signal together with the vehicle data from the platform managing server 130 through the communication module 1010. Here, the energy management data request signal may be a signal requesting the service server 140 to execute the energy management software 1021 based on the vehicle data and to transmit energy management data which is result data.

According to some embodiments, the processor 1030 may execute the energy management software 1021 in response to the vehicle data and the energy management data request signal. The processor 1030 may execute the energy management software 1021 and transmit energy management data, which is result data, to the platform managing server 130 through the communication module 1010.

Figure 11:
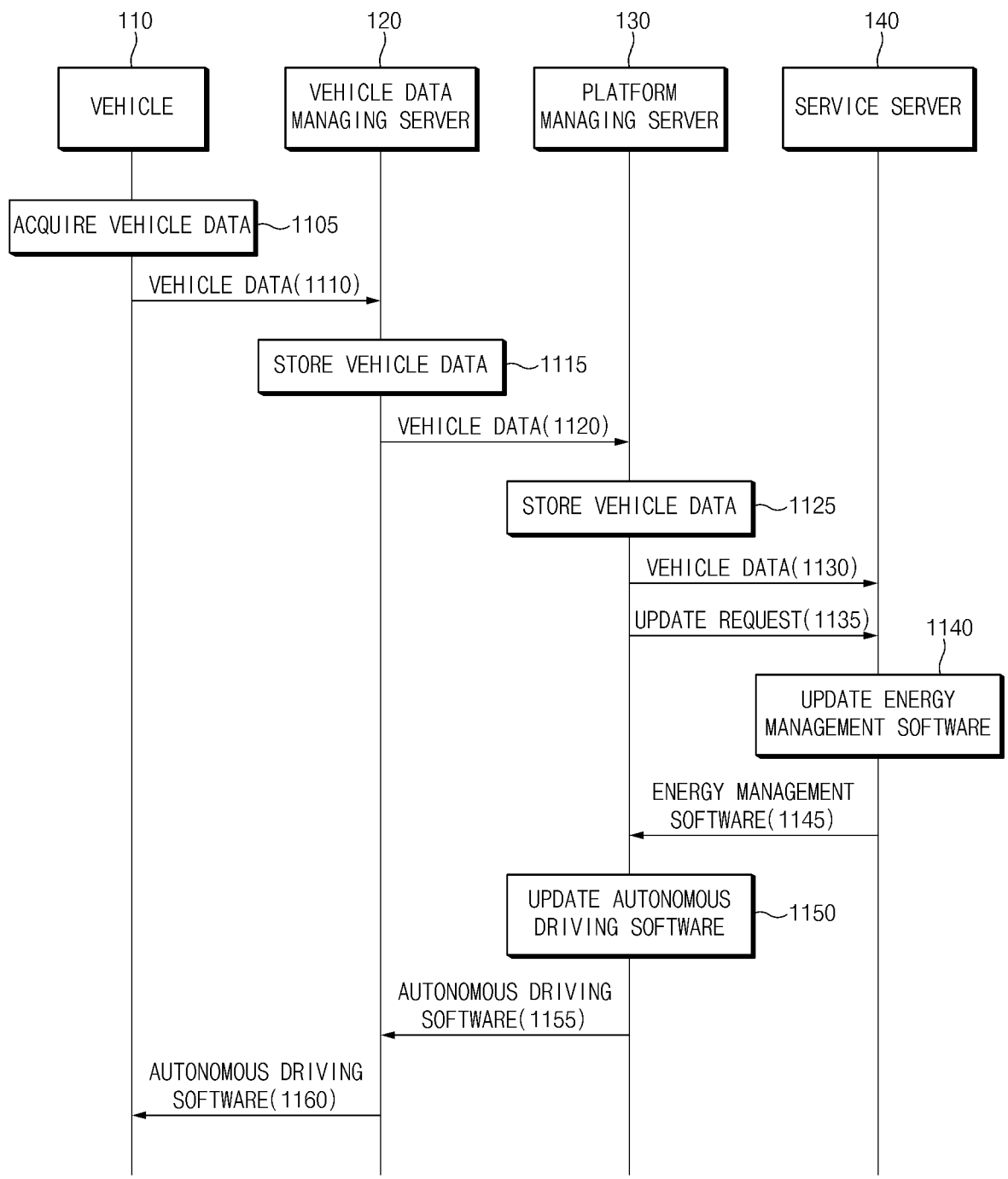
FIGS. 11 to 22 are operation flowcharts of the vehicle, the vehicle data managing server, the platform managing server, and the service server according to various embodiments.

FIG. 11 is an operation flowchart of a vehicle, a vehicle data managing server, a platform managing server, and a service server according to some embodiments. FIG. 11 may be described using the configurations of FIGS. 1, 2A, 7, 8, and 10.

The embodiment illustrated in FIG. 11 is only some embodiments, and the order of steps according to various embodiments of the present disclosure may be different from that illustrated in FIG. 11, and some steps illustrated in FIG. 11 may be omitted or the order between the steps may be changed or the steps may be merged.

Referring to FIG. 11, in operation 1105, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 1110, the vehicle 110 may transmit the vehicle data acquired in operation 1105 or stored in the memory 240 to the vehicle data managing server 120. However, without being limited to the matters described herein, the vehicle 110 may transmit the vehicle data acquired in operation 1105 or stored in the memory 240 to the platform managing server 130 without passing through the vehicle data managing server 120.

In operation 1115, the vehicle data managing server 120 may store the vehicle data acquired in operation 1110 in the memory 720.

In operation 1120, the vehicle data managing server 120 may transmit the vehicle data to the platform managing server 130.

In operation 1125, the platform managing server 130 may store the vehicle data acquired in operation 1120 in the memory 820.

In operation 1130, the platform managing server 130 may transmit vehicle data to the service server 140.

In operation 1135, the platform managing server 130 may transmit an update request signal of the energy management software 1021 to the service server 140.

In operation 1140, the service server 140 may update the energy management software 1021 in response to the vehicle data acquired in operation 1130 and the update request signal acquired in operation 1135. According to some embodiments, the service server 140 may update the energy management software 1021 based on the vehicle data. According to some embodiments, the energy management software 1021 may diagnose the degree of degradation of the battery using an artificial intelligence model. Here, the artificial intelligence model may be a software algorithm coded in a programming language and may be an artificial neural network. In this case, the service server 140 may update the energy management software 1021 by additionally training learning the artificial intelligence model based on the vehicle data.

In operation 1145, the service server 140 may transmit the updated energy management software 1021 or first update software to the platform managing server 130. Here, the first update software may be software for updating the energy management software, which is included in the autonomous driving software 821 stored in the memory 820 of the platform managing server 130, to the same version as the energy management software 1021 updated by the service server 140.

In operation 1150, the platform managing server 130 may update the autonomous driving software 821 stored in the memory 820 based on the updated energy management software or the first update software acquired in operation 1145.

In operation 1155, the platform managing server 130 may transmit the updated autonomous driving software 821 or second update software to the vehicle data managing server 120. Here, the second update software may be software for updating the autonomous driving software installed in the vehicle 110 to the same version as the autonomous driving software 821 updated by the platform managing server 130. However, without being limited to the matters described herein, the platform managing server 130 may transmit the updated autonomous driving software 821 or the second update software to the vehicle 110 without passing through the vehicle data managing server 120.

In operation 1160, the vehicle data managing server 120 may transmit the updated autonomous driving software 821 or the second update software acquired in operation 1155 to the vehicle 110.

Figure 12:
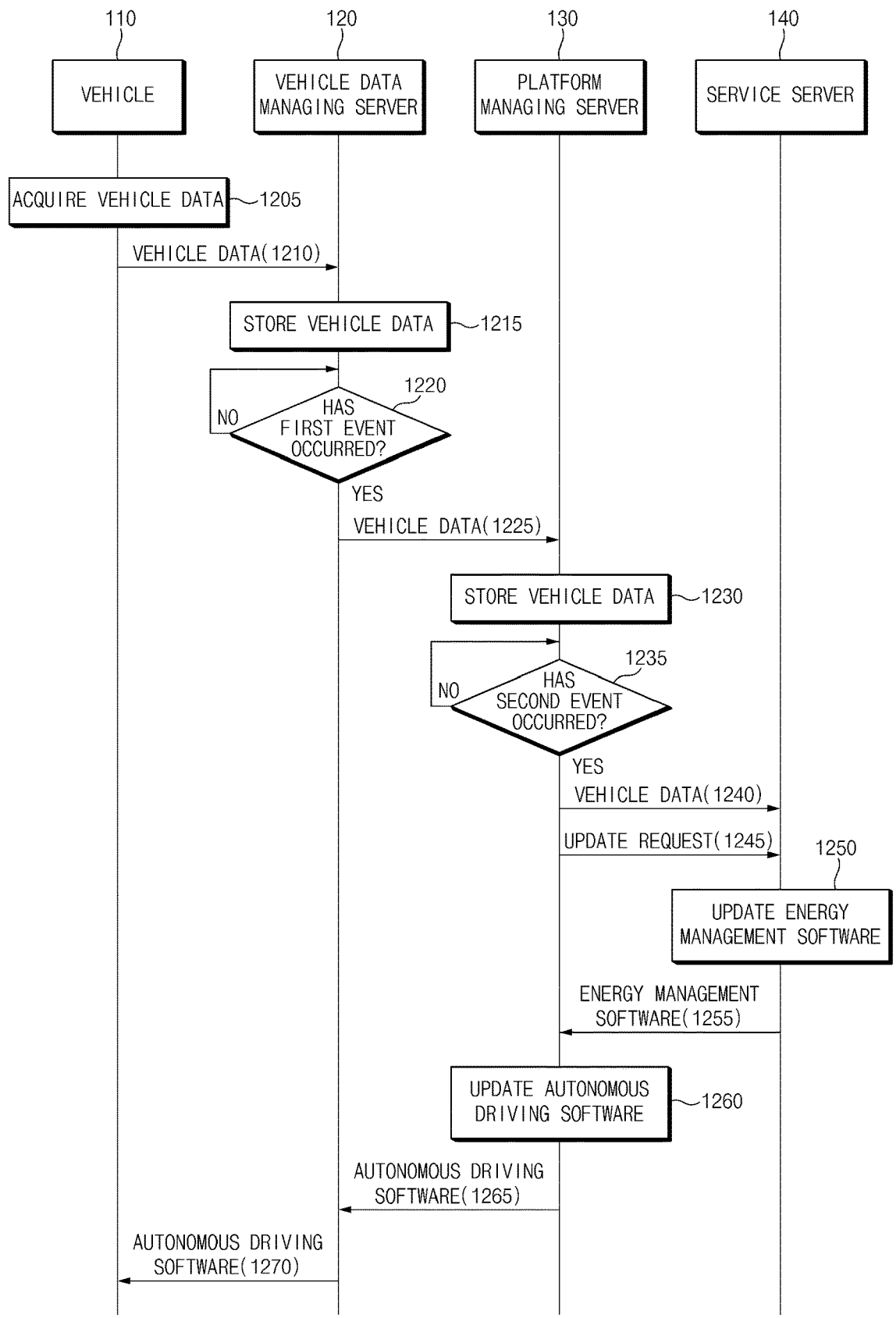

FIG. 12 is an operation flowchart of a vehicle, a vehicle data managing server, a platform managing server, and a service server according to some embodiments. FIG. 12 may be described using the configurations of FIGS. 1, 2A, 7, 8, and 10.

The embodiment illustrated in FIG. 12 is only some embodiments, and the order of steps according to various embodiments of the present disclosure may be different from that illustrated in FIG. 12, and some steps illustrated in FIG. 12 may be omitted or the order between the steps may be changed or the steps may be merged.

Referring to FIG. 12, in operation 1205, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 1210, the vehicle 110 may transmit the vehicle data acquired in operation 1205 or stored in the memory 240 to the vehicle data managing server 120.

In operation 1215, the vehicle data managing server 120 may store the vehicle data acquired in operation 1210 in at least one storage means (e.g., a memory).

In operation 1220, the vehicle data managing server 120 may identify whether a first event has occurred. For example, the first event may include a case where the vehicle data managing server 120 receives a vehicle data transmission request, a case where it is determined that an update of autonomous driving software installed in the vehicle 110 is required, and/or a case where a battery mounted on the vehicle 110 is replaced.

If it is identified that the first event has not occurred in operation 1220 ('NO'), the vehicle data managing server 120 may perform operation 1220 again.

If it is identified that the first event has occurred in operation 1220 ('YES'), in operation 1225, the vehicle data managing server 120 may transmit the vehicle data to the platform managing server 130.

In operation 1230, the platform managing server 130 may store the vehicle data acquired in operation 1225 in the memory 820.

In operation 1235, the platform managing server 130 may identify whether a second event has occurred. For example, the second event may include a case where it is determined that an update of energy management software included in autonomous driving software stored in the memory 820 is required, a case where it is determined that vehicle data matches with the energy management service provided by the service server 140 is acquired, and/or a case where the platform managing server 130 receives a simulation execution request from the vehicle data managing server 120.

If it is identified that the second event has not occurred in operation 1235 ('NO'), the platform managing server 130 may perform operation 1235 again.

If it is identified that the second event has occurred in operation 1235 ('YES'), in operation 1240, the platform managing server 130 may transmit the vehicle data to the service server 140.

In operation 1245, the platform managing server 130 may transmit an update request signal of the energy management software to the service server 140.

In operation 1250, the service server 140 may update the energy management software 1021 in response to the vehicle data acquired in operation 1240 and the update request signal acquired in operation 1245. According to some embodiments, the service server 140 may update the energy management software 1021 based on the vehicle data. According to some embodiments, the energy management software 1021 may diagnose the degree of degradation of the battery using an artificial intelligence model. Here, the artificial intelligence model is a software algorithm coded in a programming language and may be an artificial neural network. In this case, the service server 140 may update the energy management software 1021 by additionally training the artificial intelligence model based on the vehicle data.

In operation 1255, the service server 140 may transmit the updated energy management software 1021 or first update software to the platform managing server 130. Here, the first update software may be software for updating the energy management software, which is included in the autonomous driving software 821 stored in the memory 820 of the platform managing server 130, to the same version as the energy management software 1021 updated by the service server 140.

In operation 1260, the platform managing server 130 may update the autonomous driving software 821 stored in the memory 820 based on the updated energy management software or the first update software acquired in operation 1245.

In operation 1265, the platform managing server 130 may transmit the updated autonomous driving software 821 or second update software to the vehicle data managing server 120. Here, the second update software may be software for updating the autonomous driving software installed in the vehicle 110 to the same version as the autonomous driving software 821 updated by the platform managing server 130.

In operation 1270, the vehicle data managing server 120 may transmit the updated autonomous driving software 821 or the second update software acquired in operation 1255 to the vehicle 110.

Figure 13:
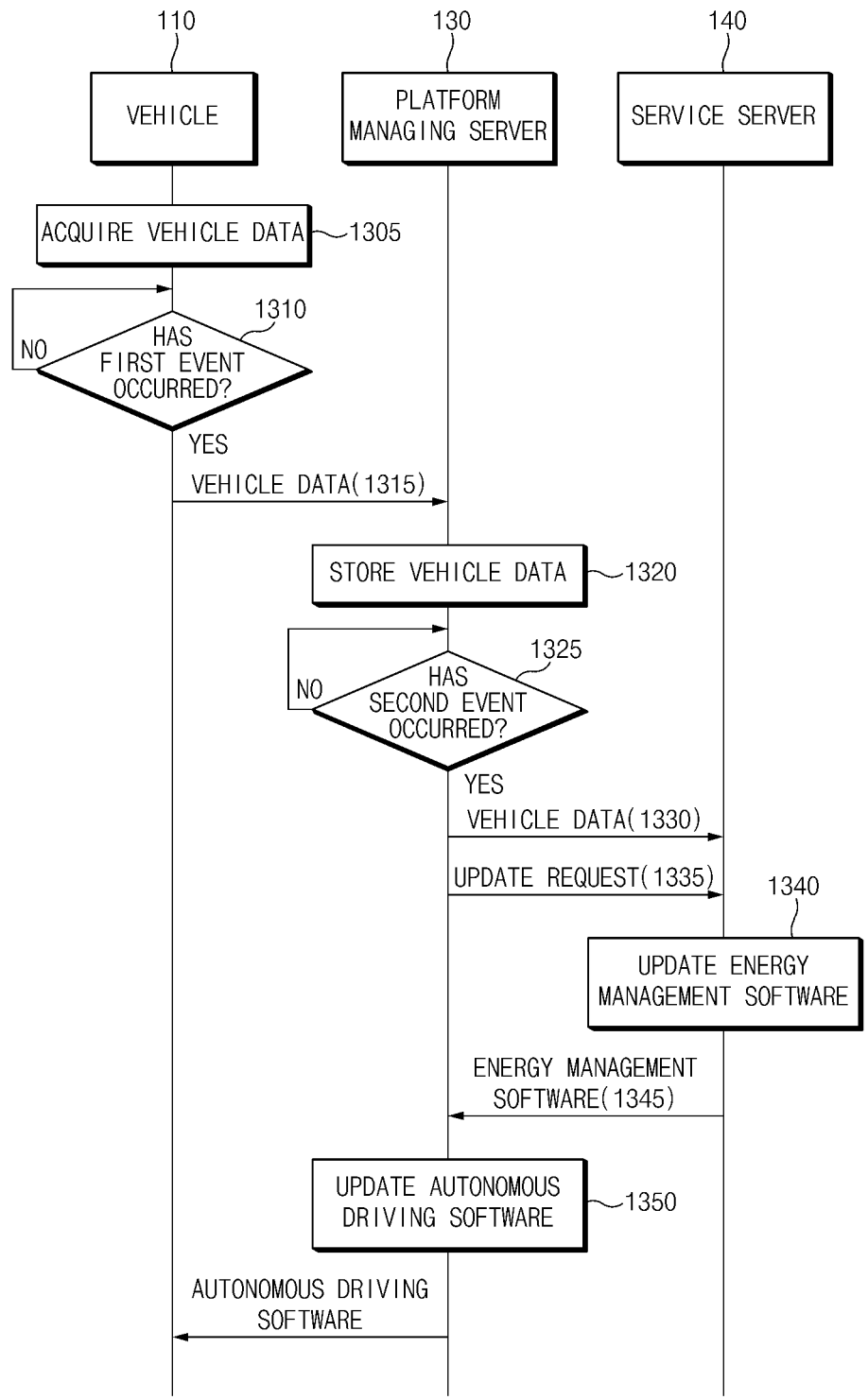

FIG. 13 is an operation flowchart of a vehicle, a vehicle data managing server, a platform managing server, and a service server according to some embodiments. FIG. 13 may be described using the configurations of FIGS. 1, 2A, 7, 8, and 10.

The embodiment illustrated in FIG. 13 is illustrative of only some embodiments, and the order of steps according to various embodiments of the present disclosure may be different from that illustrated in FIG. 13, and some steps illustrated in FIG. 13 may be omitted or the order between the steps may be changed or the steps may be merged.

Referring to FIG. 13, in operation 1305, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 1310, the vehicle 110 may identify whether a first event has occurred. For example, the first event may include a case where the vehicle data managing server 120 receives a vehicle data transmission request, a case where it is determined that an update of autonomous driving software installed in the vehicle 110 is required, and/or a case where a battery mounted on the vehicle 110 is replaced.

If it is identified that the first event has not occurred in operation 1310 ('NO'), the vehicle 110 may perform operation 1310 again.

If it is identified that the first event has occurred in operation 1310 ('YES'), in operation 1315, the vehicle 110 may transmit the vehicle data to the platform managing server 130.

In operation 1320, the platform managing server 130 may store the vehicle data acquired in operation 1315 in the memory 820.

In operation 1325, the platform managing server 130 may identify whether a second event has occurred. For example, the second event may include a case where it is determined that an update of energy management software included in autonomous driving software stored in the memory 820 is required, a case where it is determined that vehicle data matches with the energy management service provided by the service server 140 is acquired, and/or a case where the platform managing server 130 receives a simulation execution request from the vehicle data managing server 120.

If it is identified that the second event has not occurred in operation 1325 ('NO'), the platform managing server 130 may perform operation 1325 again.

If it is identified that the second event has occurred in operation 1325 ('YES'), in operation 1330, the platform managing server 130 may transmit the vehicle data to the service server 140.

In operation 1335, the platform managing server 130 may transmit an update request signal of the energy management software to the service server 140.

In operation 1340, the service server 140 may update the energy management software 1021 in response to the vehicle data acquired in operation 1330 and the update request signal acquired in operation 1335. According to some embodiments, the service server 140 may update the energy management software 1021 based on the vehicle data. According to some embodiments, the energy management software 1021 may diagnose the degree of degradation of the battery using an artificial intelligence model. Here, the artificial intelligence model is a software algorithm coded in a programming language and may be an artificial neural network. In this case, the service server 140 may update the energy management software 1021 by additionally training the artificial intelligence model based on the vehicle data.

In operation 1345, the service server 140 may transmit the updated energy management software 1021 or first update software to the platform managing server 130. Here, the first update software may be software for updating the energy management software, which is included in the autonomous driving software 821 stored in the memory 820 of the platform managing server 130, to the same version as the energy management software 1021 updated by the service server 140.

In operation 1350, the platform managing server 130 may update the autonomous driving software 821 stored in the memory 820 based on the updated energy management software or the first update software acquired in operation 1345.

In operation 1355, the platform managing server 130 may transmit the updated autonomous driving software 821 or second update software to the vehicle 110. Here, the second update software may be software for updating the autonomous driving software installed in the vehicle 110 to the same version as the autonomous driving software 821 updated by the platform managing server 130.

Figure 14:
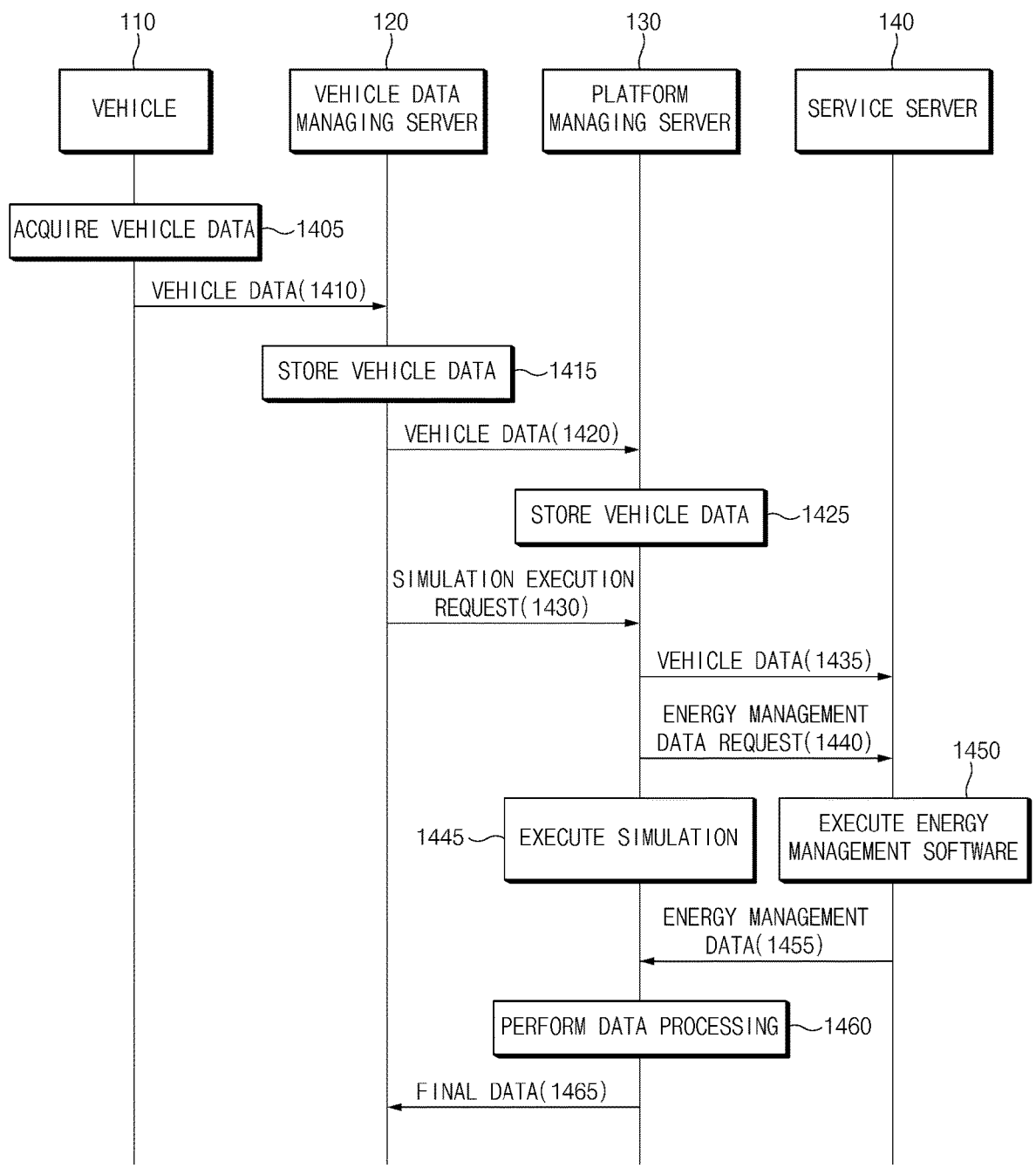

FIG. 14 is an operation flowchart of a vehicle, a vehicle data managing server, a platform managing server, and a service server according to some embodiments. FIG. 14 may be described using the configurations of FIGS. 1, 2A, 7, 8, and 10.

The embodiment illustrated in FIG. 14 is illustrative of only some embodiments, and the order of steps according to various embodiments of the present disclosure may be different from that illustrated in FIG. 14, and some steps illustrated in FIG. 14 may be omitted or the order between the steps may be changed or the steps may be merged.

Referring to FIG. 14, in operation 1405, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 1410, the vehicle 110 may transmit the vehicle data acquired in operation 1405 or stored in the memory 240 to the vehicle data managing server 120.

In operation 1415, the vehicle data managing server 120 may store the vehicle data acquired in operation 1410 in at least one storage means (e.g., a memory).

In operation 1420, the vehicle data managing server 120 may transmit the vehicle data to the platform managing server 130.

In operation 1425, the platform managing server 130 may store the vehicle data acquired in operation 1420 in the memory 820.

In operation 1430, the vehicle data managing server 120 may transmit a simulation execution request to the platform managing server 130. The simulation execution request may be a signal that causes the platform managing server 130 to execute the simulation software 823 based on the vehicle data transmitted in operation 1420.

In operation 1435, the platform managing server 130 may transmit the vehicle data acquired in operation 1420 to the service server 140 in response to the simulation execution request acquired in operation 1430.

In operation 1440, the platform managing server 130 may transmit an energy management data request signal to the service server 140. The energy management data request signal may be a signal that causes the service server 140 to execute the energy management software 1021 based on the vehicle data transmitted in operation 1435 and to transmit energy management data, which is result data of the execution.

In operation 1445, the platform managing server 130 may execute the simulation software 823 in response to the simulation execution request signal acquired in operation 1430. According to some embodiments, the platform managing server 130 may generate a virtual environment based on the vehicle data and perform autonomous driving simulation of the vehicle in the generated virtual environment. The platform managing server 130 may perform autonomous driving simulation of the vehicle in the virtual environment based on the autonomous driving software 821.

According to some embodiments, the platform managing server 130 may collect simulation data during the performance of the simulation. The simulation data may include virtual sensor data collected by a virtual sensor of a virtual vehicle implemented in the virtual environment and virtual battery data collected by a virtual BMS of the virtual vehicle.

In operation 1450, the service server 140 may execute the energy management software 1021 in response to the vehicle data acquired in operation 1435 and the energy management data request signal acquired in operation 1440. According to some embodiments, the service server 140 may execute the energy management software 1021 based on the vehicle data acquired in operation 1435.

In operation 1455, the service server 140 may transmit energy management data, which is result data of the energy management software execution in operation 1450, to the platform managing server 130.

In operation 1460, the platform managing server 130 may synthesize and/or pre-process the simulation data collected during the performance of the simulation in operation 1445 and the energy management data acquired in operation 1455.

In operation 1465, the platform managing server 130 may transmit final data generated by the synthesis and/or pre-processing in operation 1460 to the vehicle data managing server 120.

Figure 15:
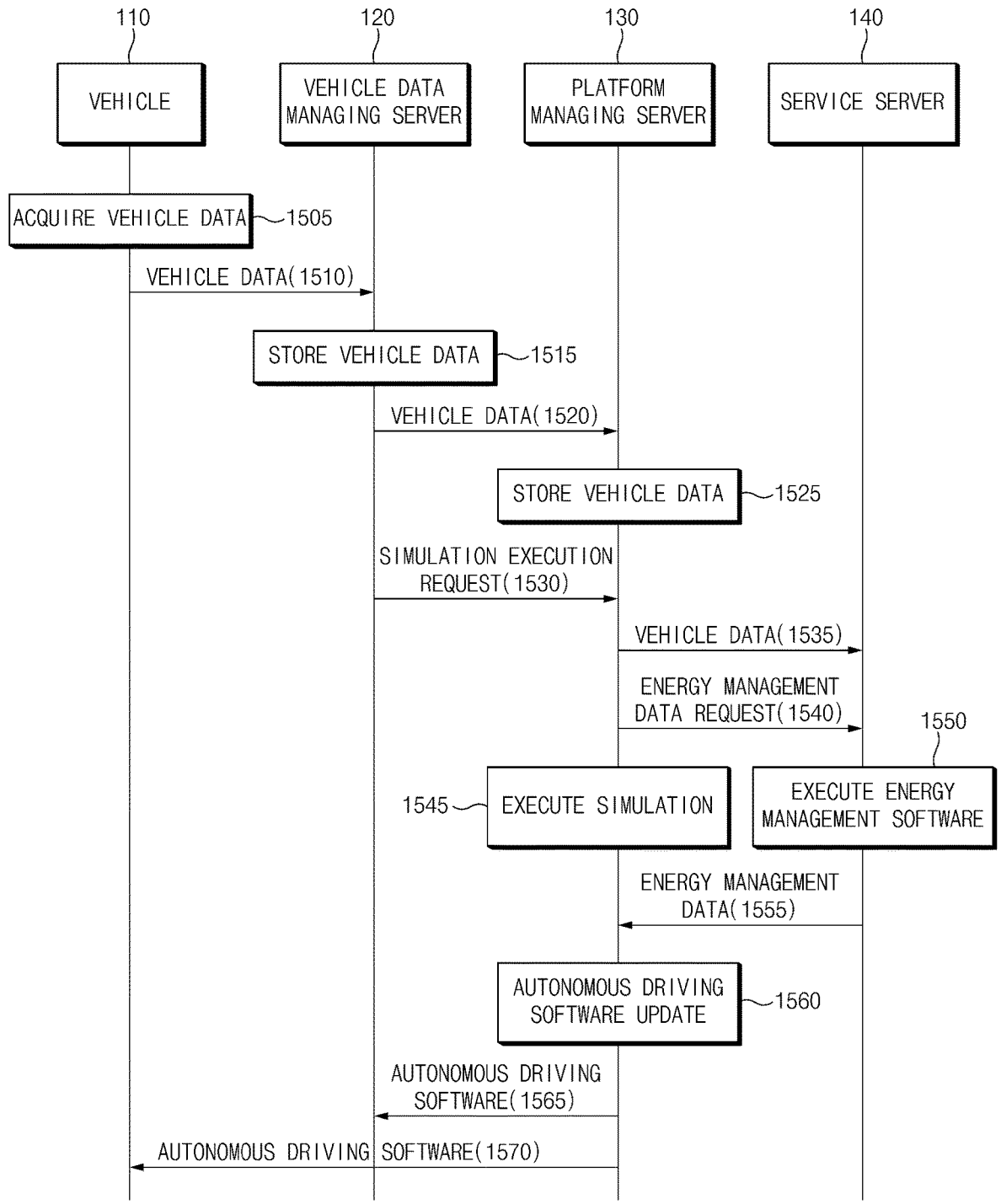

FIG. 15 is an operation flowchart of a vehicle, a vehicle data managing server, a platform managing server, and a service server according to some embodiments. FIG. 15 may be described using the configurations of FIGS. 1, 2A, 7, 8, and 10.

The embodiment illustrated in FIG. 15 is illustrative of only some embodiments, and the order of steps according to various embodiments of the present disclosure may be different from that illustrated in FIG. 15, some steps illustrated in FIG. 15 may be omitted or the order between the steps may be changed or the steps may be merged.

Referring to FIG. 15, in operation 1505, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 1510, the vehicle 110 may transmit the vehicle data acquired in operation 1505 or stored in the memory 240 to the vehicle data managing server 120.

In operation 1515, the vehicle data managing server 120 may store the vehicle data acquired in operation 1510 in at least one storage means (e.g., a memory).

In operation 1520, the vehicle data managing server 120 may transmit the vehicle data to the platform managing server 130.

In operation 1525, the platform managing server 130 may store the vehicle data acquired in operation 1520 in the memory 820.

In operation 1530, the vehicle data managing server 120 may transmit a simulation execution request to the platform managing server 130. The simulation execution request may be a signal that causes the platform managing server 130 to execute the simulation software 823 based on the vehicle data transmitted in operation 1520.

In operation 1535, the platform managing server 130 may transmit the vehicle data acquired in operation 1520 to the service server 140 in response to the simulation execution request acquired in operation 1530.

In operation 1540, the platform managing server 130 may transmit an energy management data request signal to the service server 140. The energy management data request signal may be a signal that causes the service server 140 to execute the energy management software 1021 based on the vehicle data transmitted in operation 1535 and to transmit energy management data which is result data of the execution.

In operation 1545, the platform managing server 130 may execute the simulation software 823 in response to the simulation execution request signal acquired in operation 1530. According to some embodiments, the platform managing server 130 may generate a virtual environment based on the vehicle data and perform autonomous driving simulation of the vehicle in the generated virtual environment. The platform managing server 130 may perform autonomous driving simulation of the vehicle in the virtual environment based on the autonomous driving software 821.

According to some embodiments, the platform managing server 130 may collect simulation data w during the performance of the simulation. The simulation data may include virtual sensor data collected by a virtual sensor of a virtual vehicle implemented in the virtual environment and virtual battery data collected by a virtual BMS of the virtual vehicle.

In operation 1550, the service server 140 may execute the energy management software 1021 in response to the vehicle data acquired in operation 1535 and the energy management data request signal acquired in operation 1540. According to some embodiments, the service server 140 may execute the energy management software 1021 based on the vehicle data acquired in operation 1535.

In operation 1555, the service server 140 may transmit energy management data, which is result data of the energy management software execution in operation 1550, to the platform managing server 130.

In operation 1560, the platform managing server 130 may update the autonomous driving software 821 stored in the memory 820. According to some embodiments, the platform managing server 130 may update the autonomous driving software 821 based on the simulation data collected in operation 1545 and/or the energy management data acquired in operation 1555. For example, the platform managing server 130 may update the autonomous driving software 821 through training based on the simulation data. As another example, the platform managing server 130 may update energy management software included in the autonomous driving software 821 based on energy management data.

In operation 1565, the platform managing server 130 may transmit the autonomous driving software 821 updated in operation 1560 or second update software to the vehicle data managing server 120. Here, the second update software may be software for updating the autonomous driving software installed in the vehicle 110 to the same version as the autonomous driving software 821 updated by the platform managing server 130.

In operation 1570, the platform managing server 130 may transmit the updated autonomous driving software 821 or the second update software to the vehicle 110 in operation 1560.

However, without being limited to the matters described herein, and any one of operation 1565 or operation 1570 may be omitted. For example, the platform managing server 130 may transmit the autonomous driving software 821 updated in operation 1560 or the second update software only to the vehicle data managing server 120 or only to the vehicle 110.

Figure 16:
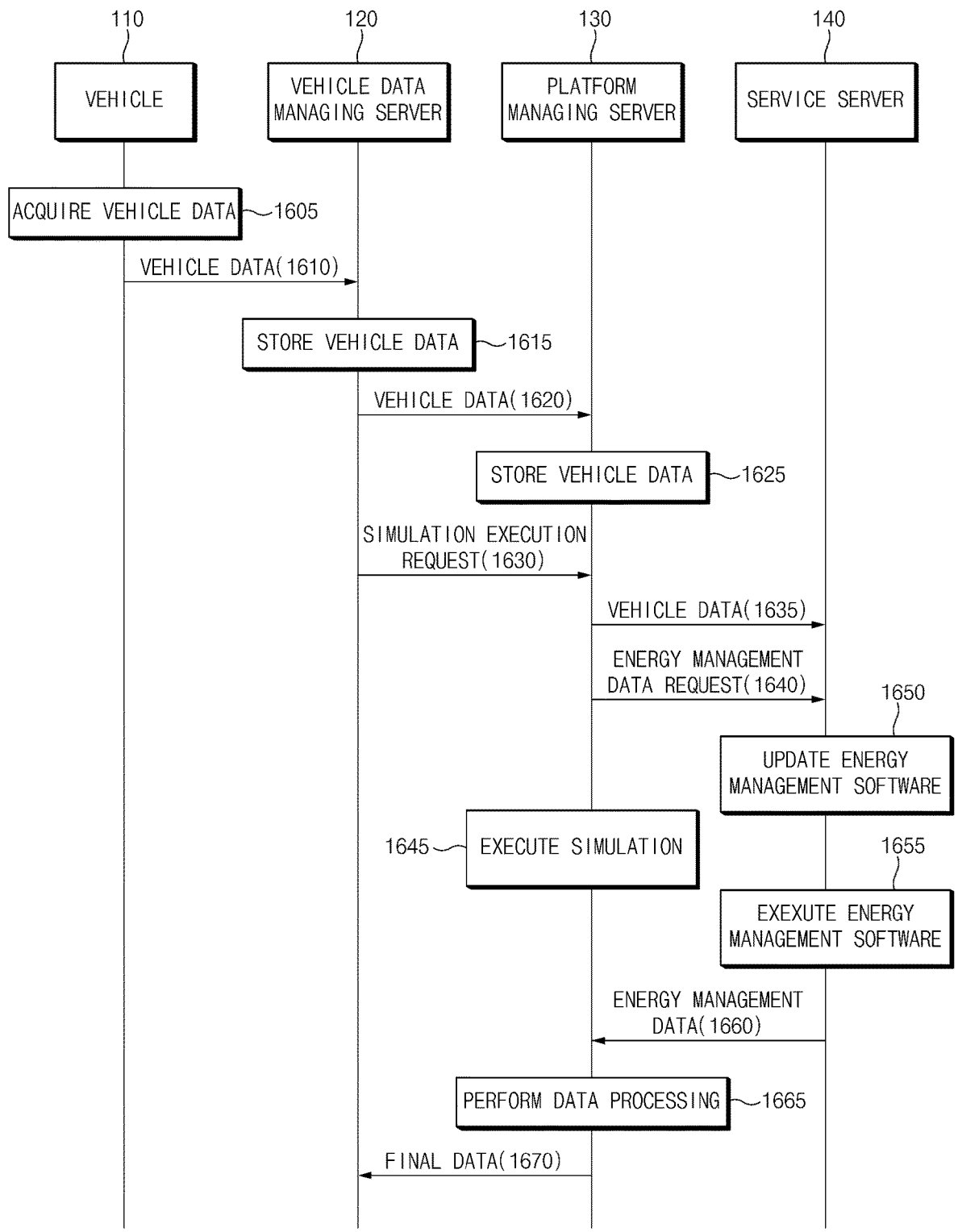

FIG. 16 is an operation flowchart of a vehicle, a vehicle data managing server, a platform managing server, and a service server according to some embodiments. FIG. 16 may be described using the configurations of FIGS. 1, 2A, 7, 8, and 10.

The embodiment illustrated in FIG. 16 is illustrative of only some embodiments, and the order of steps according to various embodiments of the present disclosure may be different from that illustrated in FIG. 16, and some steps illustrated in FIG. 16 may be omitted or the order between the steps may be changed or the steps may be merged.

Referring to FIG. 16, in operation 1605, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 1610, the vehicle 110 may transmit the vehicle data acquired in operation 1605 or stored in the memory 240 to the vehicle data managing server 120.

In operation 1615, the vehicle data managing server 120 may store the vehicle data acquired in operation 1610 in at least one storage means (e.g., a memory).

In operation 1620, the vehicle data managing server 120 may transmit the vehicle data to the platform managing server 130.

In operation 1625, the platform managing server 130 may store the vehicle data acquired in operation 1620 in the memory 820.

In operation 1630, the vehicle data managing server 120 may transmit a simulation execution request to the platform managing server 130. The simulation execution request may be a signal that causes the platform managing server 130 to execute the simulation software 823 based on the vehicle data transmitted in operation 1620.

In operation 1635, the platform managing server 130 may transmit the vehicle data acquired in operation 1620 to the service server 140 in response to the simulation execution request acquired in operation 1630.

In operation 1640, the platform managing server 130 may transmit an energy management data request signal to the service server 140. The energy management data request signal may be a signal that causes the service server 140 to execute the energy management software 1021 based on the vehicle data transmitted in operation 1635 and to transmit energy management data which is result data of the execution.

In operation 1645, the platform managing server 130 may execute the simulation software 823 in response to the simulation execution request signal acquired in operation 1630. According to some embodiments, the platform managing server 130 may generate a virtual environment based on the vehicle data and perform autonomous driving simulation of the vehicle in the generated virtual environment. The platform managing server 130 may perform the autonomous driving simulation of the vehicle in the virtual environment based on the autonomous driving software 821.

According to some embodiments, the platform managing server 130 may collect simulation data while performing the simulation. The simulation data may include virtual sensor data collected by a virtual sensor of a virtual vehicle implemented in the virtual environment and virtual battery data collected by a virtual BMS of the virtual vehicle.

In operation 1650, the service server 140 may update the energy management software 1021 in response to the vehicle data acquired in operation 1635 and the energy management data request signal acquired in operation 1640. According to some embodiments, the service server 140 may update the energy management software 1021 based on the vehicle data. According to some embodiments, the energy management software 1021 may diagnose the degree of degradation of the battery using an artificial intelligence model. Here, the artificial intelligence model is a software algorithm coded in a programming language and may be an artificial neural network. In this case, the service server 140 may update the energy management software 1021 by additionally training the artificial intelligence model based on the vehicle data.

In operation 1655, the service server 140 may execute the energy management software 1021. The energy management software 1021 executed in operation 1655 may be software updated in operation 1650. According to some embodiments, the service server 140 may execute the energy management software 1021 based on the vehicle data acquired in operation 1635.

In operation 1660, the service server 140 may transmit energy management data, which is result data of the energy management software execution in operation 1655, to the platform managing server 130.

In operation 1665, the platform managing server 130 may synthesize and/or pre-process the simulation data collected during the performance of the simulation in operation 1645 and the energy management data acquired in operation 1660.

In operation 1670, the platform managing server 130 may transmit final data generated by the synthesis and/or pre-processing in operation 1665 to the vehicle data managing server 120.

Figure 17:
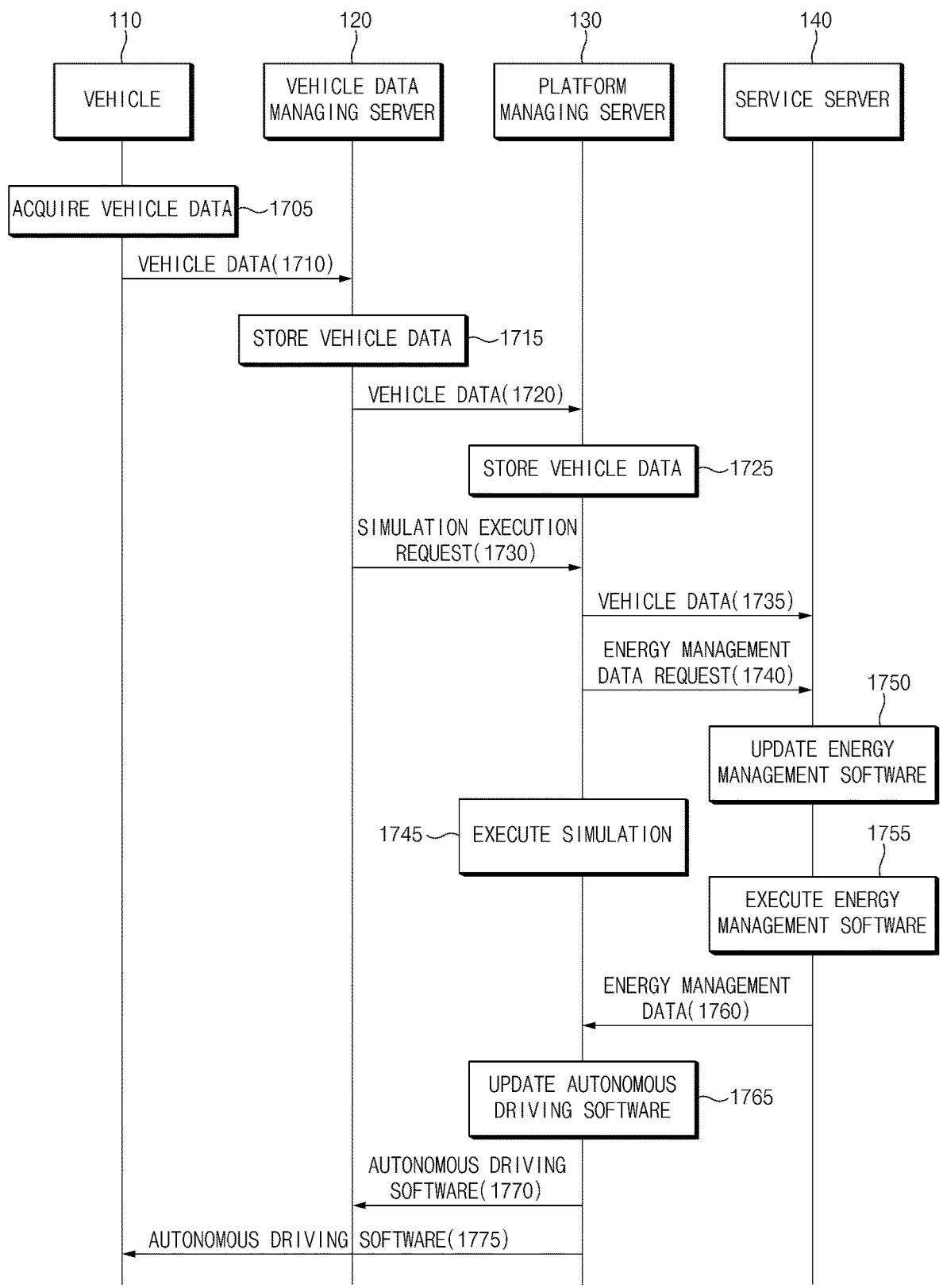

FIG. 17 is an operation flowchart of a vehicle, a vehicle data managing server, a platform managing server, and a service server according to some embodiments. FIG. 17 may be described using the configurations of FIGS. 1, 2A, 7, 8, and 10.

The embodiment illustrated in FIG. 17 is illustrative of only some embodiments, and the order of steps according to various embodiments of the present disclosure may be different from that illustrated in FIG. 17, some steps illustrated in FIG. 17 may be omitted or the order between the steps may be changed or the steps may be merged.

Referring to FIG. 17, in operation 1705, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 1710, the vehicle 110 may transmit the vehicle data acquired in operation 1705 or stored in the memory 240 to the vehicle data managing server 120.

In operation 1715, the vehicle data managing server 120 may store the vehicle data acquired in operation 1710 in at least one storage means (e.g., a memory).

In operation 1720, the vehicle data managing server 120 may transmit the vehicle data to the platform managing server 130.

In operation 1725, the platform managing server 130 may store the vehicle data acquired in operation 1720 in the memory 820.

In operation 1730, the vehicle data managing server 120 may transmit a simulation execution request to the platform managing server 130. The simulation execution request may be a signal that causes the platform managing server 130 to execute the simulation software 823 based on the vehicle data transmitted in operation 1720.

In operation 1735, the platform managing server 130 may transmit the vehicle data acquired in operation 1720 to the service server 140 in response to the simulation execution request acquired in operation 1730.

In operation 1740, the platform managing server 130 may transmit an energy management data request signal to the service server 140. The energy management data request signal may be a signal that causes the service server 140 to execute the energy management software 1021 based on the vehicle data transmitted in operation 1735 and to transmit energy management data which is result data of the execution.

In operation 1745, the platform managing server 130 may execute the simulation software 823 in response to the simulation execution request signal acquired in operation 1730. According to some embodiments, the platform managing server 130 may generate a virtual environment based on the vehicle data and perform autonomous driving simulation of the vehicle in the generated virtual environment. The platform managing server 130 may perform autonomous driving simulation of the vehicle in the virtual environment based on the autonomous driving software 821.

According to some embodiments, the platform managing server 130 may collect simulation data during the performance of the simulation. The simulation data may include virtual sensor data collected by a virtual sensor of a virtual vehicle implemented in the virtual environment and virtual battery data collected by a virtual BMS of the virtual vehicle.

In operation 1750, the service server 140 may update the energy management software 1021 in response to the vehicle data acquired in operation 1735 and the energy management data request signal acquired in operation 1740. According to some embodiments, the service server 140 may update the energy management software 1021 based on the vehicle data. According to some embodiments, the energy management software 1021 may diagnose the degree of degradation of the battery using an artificial intelligence model. Here, the artificial intelligence model is a software algorithm coded in a programming language and may be an artificial neural network. In this case, the service server 140 may update the energy management software 1021 by additionally training the artificial intelligence model based on the vehicle data.

In operation 1755, the service server 140 may execute the energy management software 1021. The energy management software 1021 executed in operation 1755 may be the software updated in operation 1750. According to some embodiments, the service server 140 may execute the energy management software 1021 based on the vehicle data acquired in operation 1735.

In operation 1760, the service server 140 may transmit energy management data, which is result data of the energy management software execution in operation 1755, to the platform managing server 130.

In operation 1765, the platform managing server 130 may update the autonomous driving software 821 stored in the memory 820. According to some embodiments, the platform managing server 130 may update the autonomous driving software 821 based on the simulation data collected in operation 1745 and/or the energy management data acquired in operation 1760. For example, the platform managing server 130 may update the autonomous driving software 821 through training based on the simulation data. As another example, the platform managing server 130 may update the energy management software included in the autonomous driving software 821 based on the energy management data.

In operation 1770, the platform managing server 130 may transmit the autonomous driving software 821 updated in operation 1765 or second update software to the vehicle data managing server 120. Here, the second update software may be software for updating the autonomous driving software installed in the vehicle 110 to the same version as the autonomous driving software 821 updated by the platform managing server 130.

In operation 1775, the platform managing server 130 may transmit the autonomous driving software 821 updated in operation 1765 or the second update software to the vehicle 110.

However, without being limited to the matters described herein, any one of operation 1770 or operation 1775 may be omitted. For example, the platform managing server 130 may transmit the autonomous driving software 821 updated in operation 1765 or the second update software only to the vehicle data managing server 120 or only to the vehicle 110.

Figure 18:
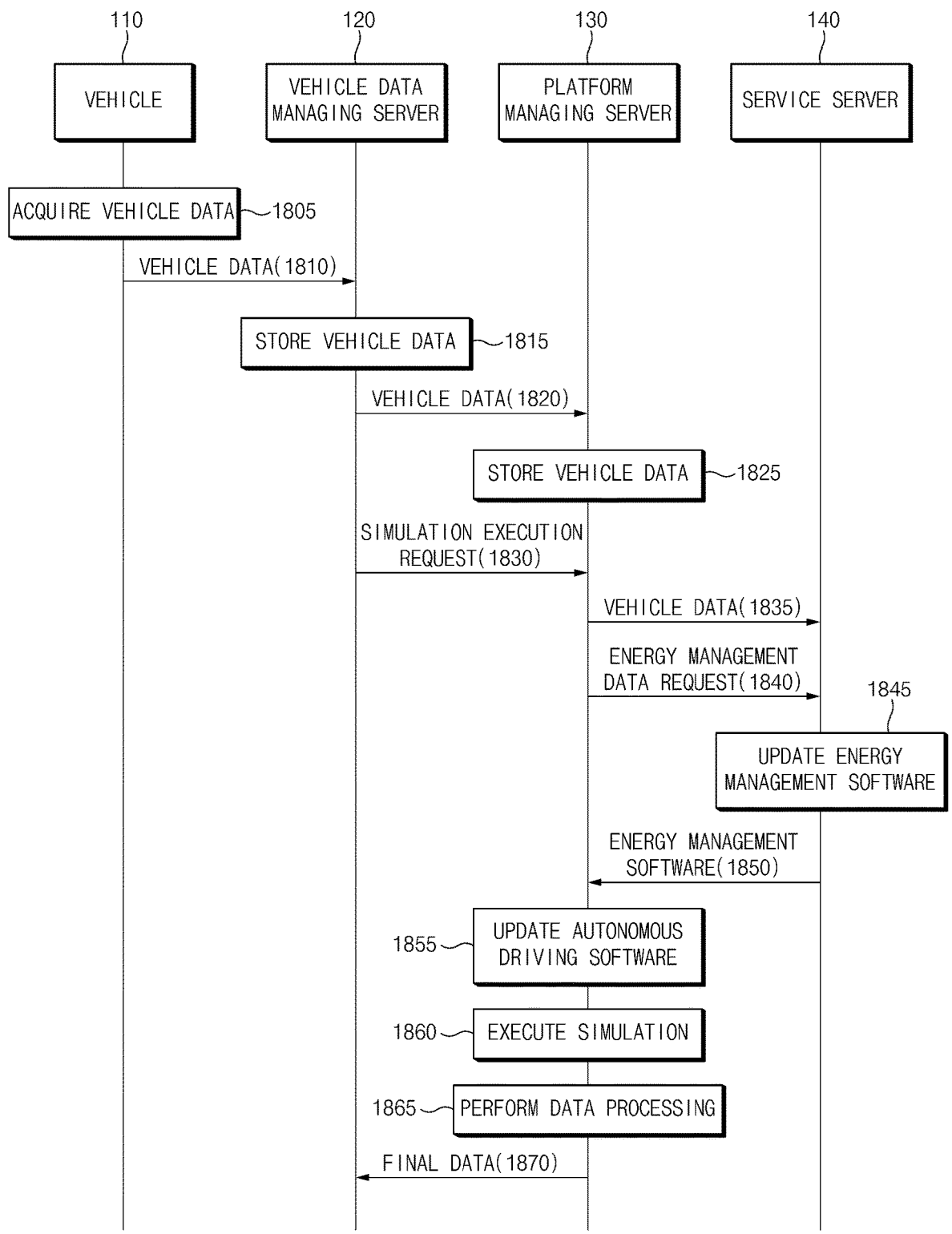

FIG. 18 is an operation flowchart of a vehicle, a vehicle data managing server, a platform managing server, and a service server according to some embodiments. FIG. 18 may be described using the configurations of FIGS. 1, 2A, 7, 8, and 10.

The embodiment illustrated in FIG. 18 is illustrative of only some embodiments, and the order of steps according to various embodiments of the present disclosure may be different from that illustrated in FIG. 18, some steps illustrated in FIG. 18 may be omitted, or the order between the steps may be changed or the steps may be merged.

Referring to FIG. 18, in operation 1805, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 1810, the vehicle 110 may transmit the vehicle data acquired in operation 1805 or stored in the memory 240 to the vehicle data managing server 120.

In operation 1815, the vehicle data managing server 120 may store the vehicle data acquired in operation 1810 in at least one storing unit (e.g., a memory).

In operation 1820, the vehicle data managing server 120 may transmit the vehicle data to the platform managing server 130.

In operation 1825, the platform managing server 130 may store the vehicle data acquired in operation 1820 in the memory 820.

In operation 1830, the vehicle data managing server 120 may transmit a simulation execution request to the platform managing server 130. The simulation execution request may be a signal that causes the platform managing server 130 to execute the simulation software 823 based on the vehicle data transmitted in operation 1820.

In operation 1835, the platform managing server 130 may transmit the vehicle data acquired in operation 1820 to the service server 140 in response to the simulation execution request acquired in operation 1830.

In operation 1840, the platform managing server 130 may transmit an update request signal of energy management software to the service server 140.

In operation 1845, the service server 140 may update the energy management software 1021 in response to the vehicle data acquired in operation 1835 and the update request signal acquired in operation 1840. According to some embodiments, the service server 140 may update the energy management software 1021 based on the vehicle data. According to some embodiments, the energy management software 1021 may diagnose the degree of degradation of the battery using an artificial intelligence model. Here, the artificial intelligence model is a software algorithm coded in a programming language and may be an artificial neural network. In this case, the service server 140 may update the energy management software 1021 by additionally training the artificial intelligence model based on the vehicle data.

In operation 1850, the service server 140 may transmit the updated energy management software 1021 or first update software to the platform managing server 130. Here, the first update software may be software for updating the energy management software included in the autonomous driving software 821 stored in the memory 820 of the platform managing server 130 to the same version as the energy management software 1021 updated by the service server 140.

In operation 1855, the platform managing server 130 may update the autonomous driving software 821 stored in the memory 820 based on the updated energy management software or the first update software acquired in operation 1850.

In operation 1860, the platform managing server 130 may execute the simulation software 823. According to some embodiments, the platform managing server 130 may generate a virtual environment based on vehicle data and perform autonomous driving simulation of the vehicle in the generated virtual environment. The platform managing server 130 may perform the autonomous driving simulation of the vehicle in the virtual environment based on the autonomous driving software 821. Here, the autonomous driving software 821 associated with the simulation software 823 when the simulation software 823 is executed may be software updated in operation 1855.

In operation 1865, the platform managing server 130 may perform pre-processing of simulation data collected during the performance of the simulation in operation 1860.

In operation 1870, the platform managing server 130 may transmit final data generated by the preprocessing of operation 1865 to the vehicle data managing server 120.

Figure 19:
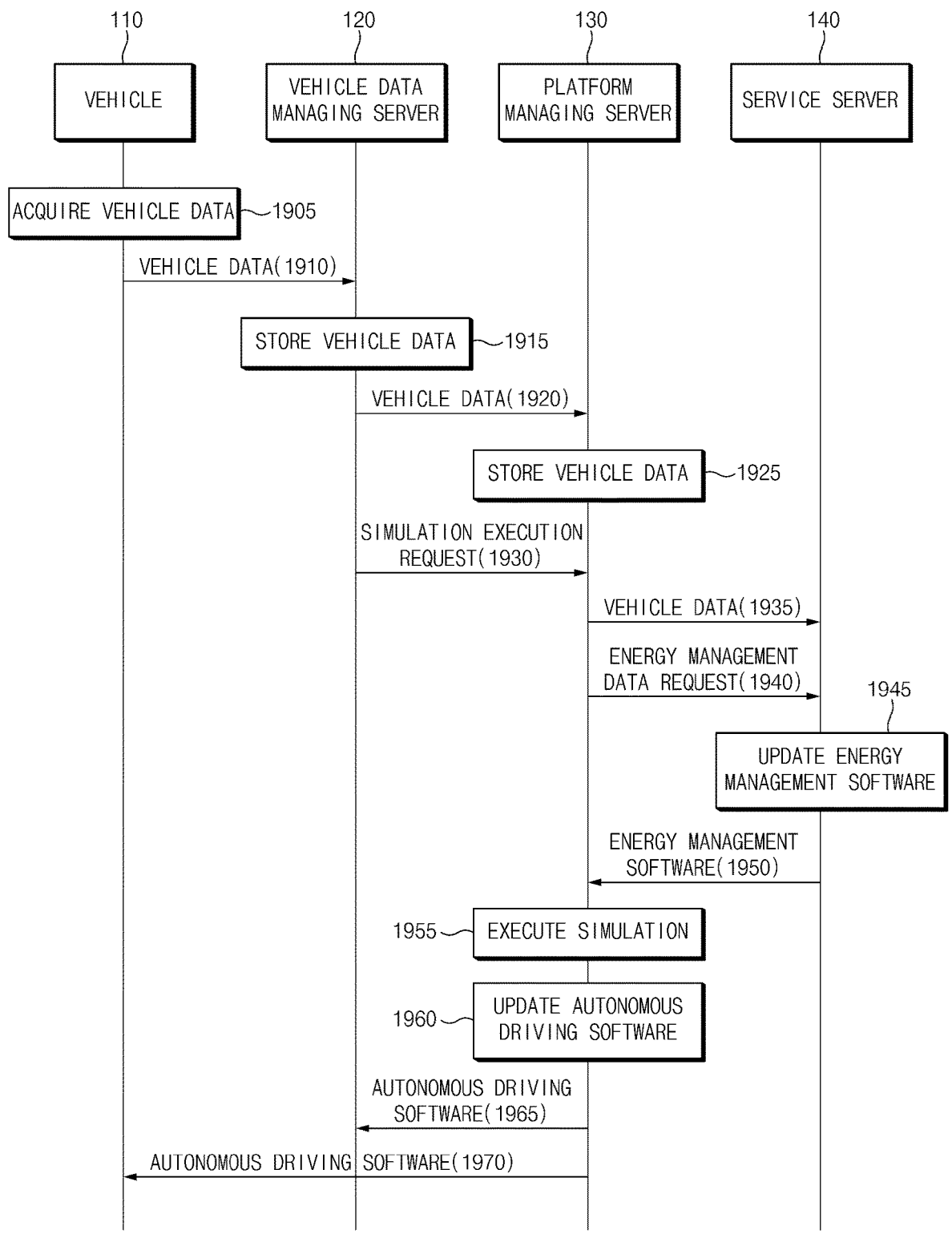

FIG. 19 is an operation flowchart of a vehicle, a vehicle data managing server, a platform managing server, and a service server according to some embodiments. FIG. 19 may be described using the configurations of FIGS. 1, 2A, 7, 8, and 10.

The embodiment illustrated in FIG. 19 is illustrative of only some embodiments, and the order of steps according to various embodiments of the present disclosure may be different from that illustrated in FIG. 19, some steps illustrated in FIG. 19 may be omitted or the order between the steps may be changed or the steps may be merged.

Referring to FIG. 19, in operation 1905, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 1910, the vehicle 110 may transmit the vehicle data acquired in operation 1905 or stored in the memory 240 to the vehicle data managing server 120.

In operation 1915, the vehicle data managing server 120 may store the vehicle data acquired in operation 1910 in at least one storing unit (e.g., a memory).

In operation 1920, the vehicle data managing server 120 may transmit the vehicle data to the platform managing server 130.

In operation 1925, the platform managing server 130 may store the vehicle data acquired in operation 1920 in the memory 820.

In operation 1930, the vehicle data managing server 120 may transmit a simulation execution request to the platform managing server 130. The simulation execution request may be a signal that causes the platform managing server 130 to execute the simulation software 823 based on the vehicle data transmitted in operation 1920.

In operation 1935, the platform managing server 130 may transmit the vehicle data acquired in operation 1920 to the service server 140 in response to the simulation execution request acquired in operation 1930.

In operation 1940, the platform managing server 130 may transmit an update request signal of energy management software to the service server 140.

In operation 1945, the service server 140 may update the energy management software 1021 in response to the vehicle data acquired in operation 1935 and the update request signal acquired in operation 1940. According to some embodiments, the service server 140 may update the energy management software 1021 based on the vehicle data. According to some embodiments, the energy management software 1021 may diagnose the degree of degradation of the battery using an artificial intelligence model. Here, the artificial intelligence model is a software algorithm coded in a programming language and may be an artificial neural network. In this case, the service server 140 may update the energy management software 1021 by additionally training the artificial intelligence model based on the vehicle data.

In operation 1950, the service server 140 may transmit the updated energy management software 1021 or first update software to the platform managing server 130. Here, the first update software may be software for updating the energy management software included in the autonomous driving software 821 stored in the memory 820 of the platform managing server 130 to the same version as the energy management software 1021 updated by the service server 140.

In operation 1955, the platform managing server 130 may execute the simulation software 823. According to some embodiments, the platform managing server 130 may generate a virtual environment based on the vehicle data and perform autonomous driving simulation of the vehicle in the generated virtual environment. The platform managing server 130 may perform the autonomous driving simulation of the vehicle in the virtual environment based on the autonomous driving software 821. In one embodiment, the autonomous driving software 821 associated with the simulation software 823 when the simulation software 823 is executed may be updated energy management software acquired in operation 1950 or software updated based on the first update software.

In operation 1960, the platform managing server 130 may update the autonomous driving software 821 stored in the memory 820. According to some embodiments, the platform managing server 130 may update the autonomous driving software 821 based on the simulation data collected in operation 1955 and/or the updated energy management software or the first update software acquired in operation 1950. For example, the platform managing server 130 may update the autonomous driving software 821 through training based on the simulation data. As another example, the platform managing server 130 may update the energy management software included in the autonomous driving software 821 based on the updated energy management software or the first update software acquired in operation 1950.

In operation 1965, the platform managing server 130 may transmit the autonomous driving software 821 updated in operation 1960 or second update software to the vehicle data managing server 120. Here, the second update software may be software for updating the autonomous driving software installed in the vehicle 110 to the same version as the autonomous driving software 821 updated by the platform managing server 130.

In operation 1970, the platform managing server 130 may transmit the autonomous driving software 821 updated in operation 1960 or the second update software to the vehicle 110.

However, without being limited to the matters described herein, any one of operation 1965 or operation 1970 may be omitted. For example, the platform managing server 130 may transmit the autonomous driving software 821 updated in operation 1960 or the second update software only to the vehicle data managing server 120 or only to the vehicle 110.

Figure 20:
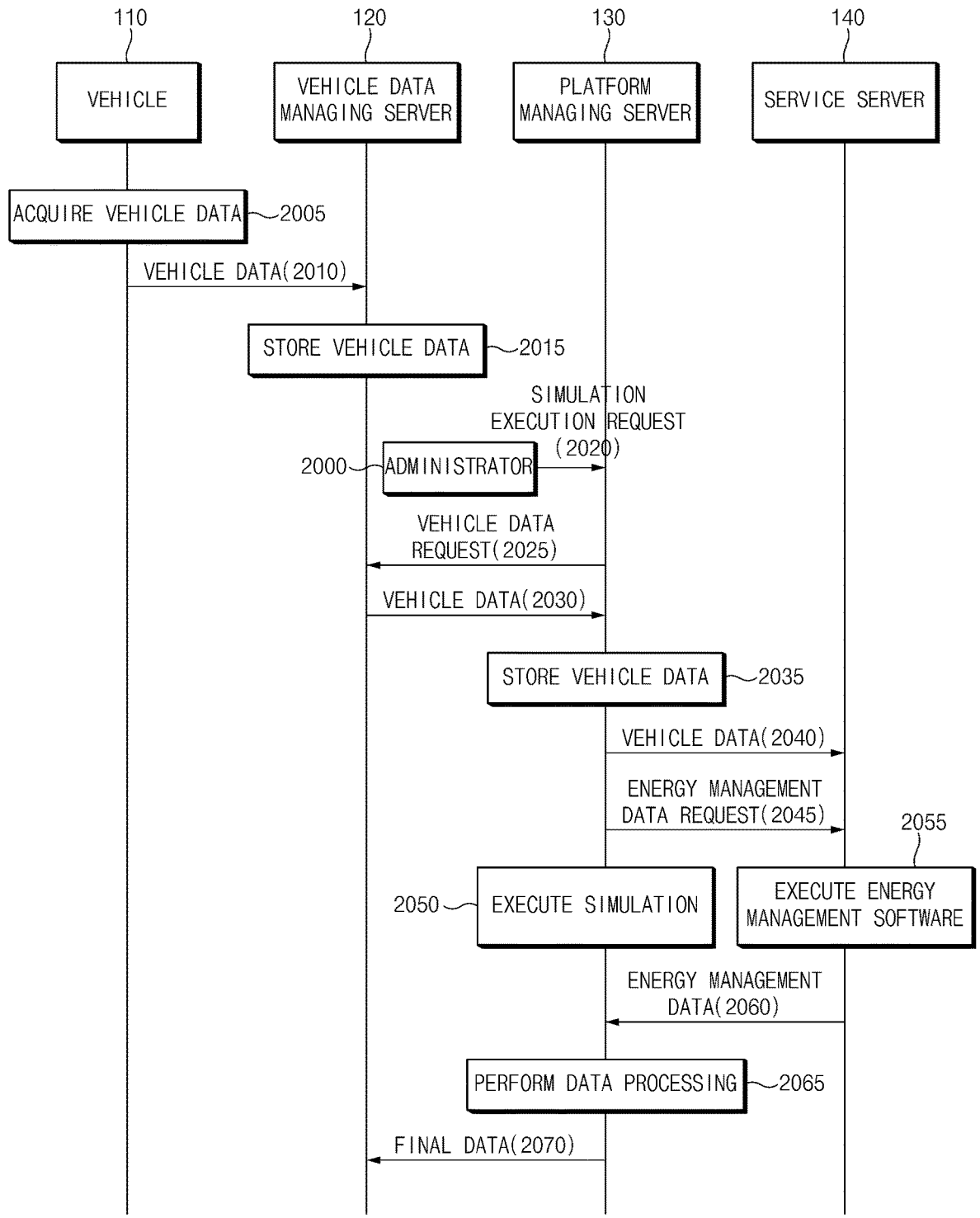

FIG. 20 is an operation flowchart of a vehicle, a vehicle data managing server, a platform managing server, and a service server according to some embodiments. FIG. 20 may be described using the configurations of FIGS. 1, 2A, 7, 8, and 10.

The embodiment illustrated in FIG. 20 is illustrative of only some embodiments, and the order of steps according to various embodiments of the present disclosure may be different from that illustrated in FIG. 20, some steps illustrated in FIG. 20 may be omitted, or the order between the steps may be changed or the steps may be merged.

Referring to FIG. 20, in operation 2005, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 2010, the vehicle 110 may transmit the vehicle data acquired in operation 2005 or stored in the memory 240 to the vehicle data managing server 120.

In operation 2015, the vehicle data managing server 120 may store the vehicle data acquired in operation 2010 in at least one storage means (e.g., a memory).

In operation 2020, an administrator 1300 may transmit a simulation execution request signal to the platform managing server 130. Here, the simulation execution request signal transmitted by the administrator 1300 instead of the vehicle data managing server 120 may be a request signal for requesting the platform managing server 130 to collect vehicle data by itself and to execute a simulation based on the collected vehicle data.

In operation 2025, the platform managing server 130 may transmit a vehicle data request signal to the vehicle data managing server 120.

In operation 2030, the vehicle data managing server 120 may transmit the vehicle data to the platform managing server 130 in response to the vehicle data request signal acquired in operation 2025.

In operation 2035, the platform managing server 130 may store the vehicle data acquired in operation 2030 in the memory 820.

In operation 2040, the platform managing server 130 may transmit the vehicle data to the service server 140.

In operation 2045, the platform managing server 130 may transmit an energy management data request signal to the service server 140. The energy management data request signal may be a signal that causes the service server 140 to execute the energy management software 1021 based on the vehicle data transmitted in operation 2040 and to transmit energy management data which is result data of the execution.

In operation 2050, the platform managing server 130 may execute the simulation software 823. According to some embodiments, the platform managing server 130 may generate a virtual environment based on the vehicle data and perform autonomous driving simulation of the vehicle in the generated virtual environment. The platform managing server 130 may perform the autonomous driving simulation of the vehicle in the virtual environment based on the autonomous driving software 821.

According to some embodiments, the platform managing server 130 may collect simulation data during the performance of the simulation. The simulation data may include virtual sensor data collected by a virtual sensor of a virtual vehicle implemented in the virtual environment and virtual battery data collected by a virtual BMS of the virtual vehicle.

In operation 2055, the service server 140 may execute the energy management software 1021 in response to the vehicle data acquired in operation 2040 and the energy management data request signal acquired in operation 2045.

In operation 2060, the service server 140 may transmit energy management data, which is result data of the energy management software execution in operation 2055, to the platform managing server 130.

In operation 2065, the platform managing server 130 may synthesize and/or pre-process the simulation data collected during the performance of the simulation in operation 2050 and the energy management data acquired in operation 2060.

In operation 2070, the platform managing server 130 may transmit final data generated by the synthesis and/or pre-processing of operation 2065 to the vehicle data managing server 120.

Figure 21:
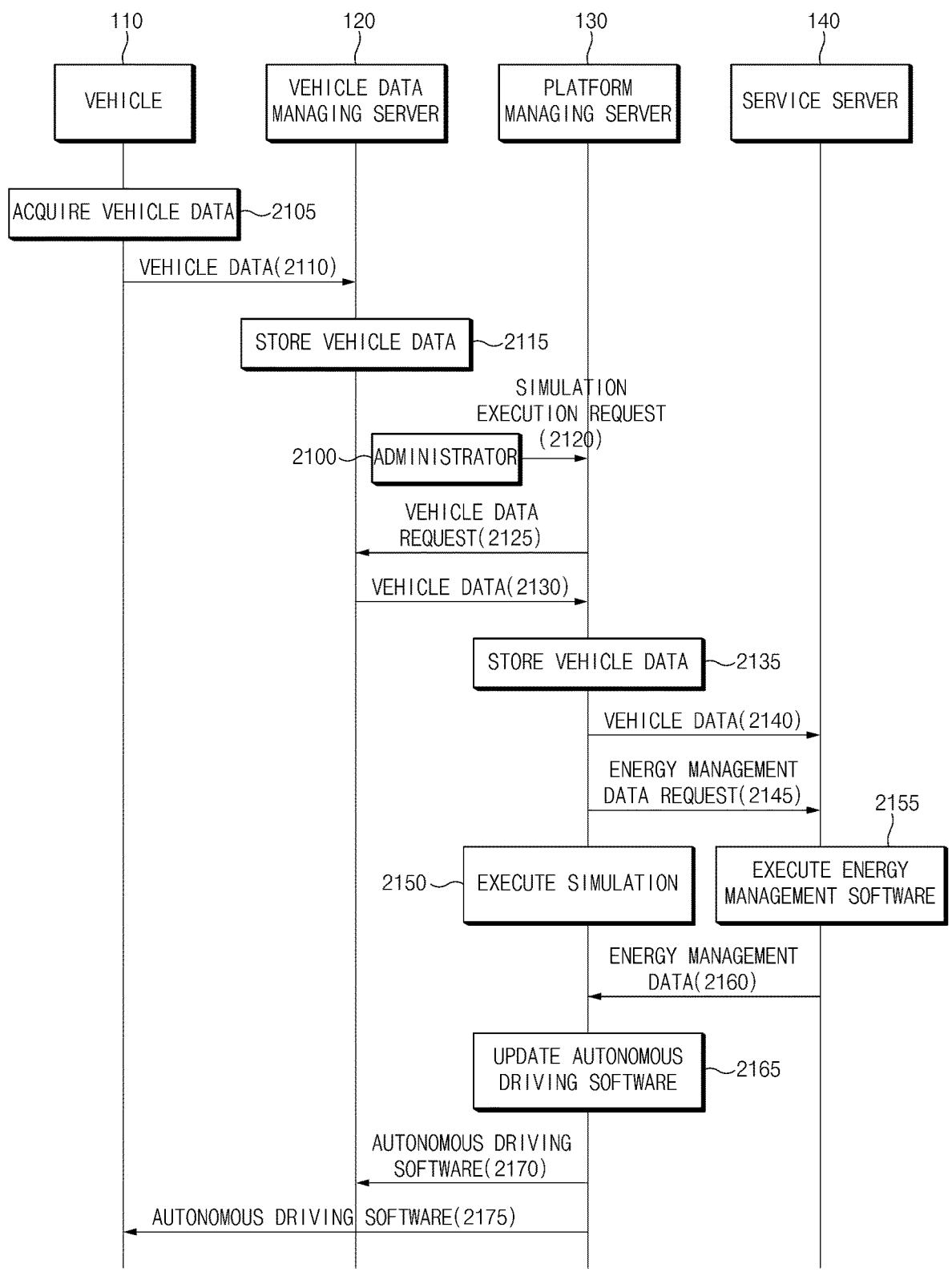

FIG. 21 is an operation flowchart of a vehicle, a vehicle data managing server, a platform managing server, and a service server according to some embodiments. FIG. 21 may be described using the configurations of FIGS. 1, 2A, 7, 8, and 10.

The embodiment illustrated in FIG. 21 is illustrative of only some embodiments, and the order of steps according to various embodiments of the present disclosure may be different from that illustrated in FIG. 21, and some steps illustrated in FIG. 21 may be omitted or the order between the steps may be changed or the steps may be merged.

Referring to FIG. 21, in operation 2105, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 2110, the vehicle 110 may transmit the vehicle data acquired in operation 2105 or stored in the memory 240 to the vehicle data managing server 120.

In operation 2115, the vehicle data managing server 120 may store the vehicle data acquired in operation 2110 in at least one storing unit (e.g., a memory).

In operation 2120, the administrator 1300 may transmit a simulation execution request signal to the platform managing server 130. Here, the simulation execution request signal transmitted by the administrator 1300 instead of the vehicle data managing server 120 may be a request signal for requesting the platform managing server 130 to collect vehicle data by itself and to execute a simulation based on the collected vehicle data.

In operation 2125, the platform managing server 130 may transmit a vehicle data request signal to the vehicle data managing server 120.

In operation 2130, the vehicle data managing server 120 may transmit the vehicle data to the platform managing server 130 in response to the vehicle data request signal acquired in operation 2125.

In operation 2135, the platform managing server 130 may store the vehicle data acquired in operation 2130 in the memory 820.

In operation 2140, the platform managing server 130 may transmit the vehicle data to the service server 140.

In operation 2145, the platform managing server 130 may transmit an energy management data request signal to the service server 140. The energy management data request signal may be a signal that causes the service server 140 to execute the energy management software 1021 based on the vehicle data transmitted in operation 2140 and to transmit energy management data which is result data of the execution.

In operation 2150, the platform managing server 130 may execute the simulation software 823. According to some embodiments, the platform managing server 130 may generate a virtual environment based on the vehicle data and perform autonomous driving simulation of the vehicle in the generated virtual environment. The platform managing server 130 may perform the autonomous driving simulation of the vehicle in the virtual environment based on the autonomous driving software 821.

According to some embodiments, the platform managing server 130 may collect simulation data during the performance of the simulation. The simulation data may include virtual sensor data collected by a virtual sensor of a virtual vehicle implemented in the virtual environment and virtual battery data collected by a virtual BMS of the virtual vehicle.

In operation 2155, the service server 140 may execute the energy management software 1021 in response to the vehicle data acquired in operation 2140 and the energy management data request signal acquired in operation 2145.

In operation 2160, the service server 140 may transmit energy management data, which is result data of the energy management software execution in operation 2155, to the platform managing server 130.

In operation 2165, the platform managing server 130 may update the autonomous driving software 821 stored in the memory 820. According to some embodiments, the platform managing server 130 may update the autonomous driving software 821 based on the simulation data collected in operation 2150 and/or the energy management data acquired in operation 2160. For example, the platform managing server 130 may update the autonomous driving software 821 through training based on the simulation data. As another example, the platform managing server 130 may update energy management software included in the autonomous driving software 821 based on energy management data.

In operation 2170, the platform managing server 130 may transmit the autonomous driving software 821 updated in operation 2165 or second update software to the vehicle data managing server 120. Here, the second update software may be software for updating the autonomous driving software installed in the vehicle 110 to the same version as the autonomous driving software 821 updated by the platform managing server 130.

In operation 2175, the platform managing server 130 may transmit the autonomous driving software 821 updated in operation 2165 or the second update software to the vehicle 110.

However, without being limited to the matters described herein, any one of operation 2170 or operation 2175 may be omitted. For example, the platform managing server 130 may transmit the autonomous driving software 821 updated in operation 2165 or the second update software only to the vehicle data managing server 120 or only to the vehicle 110.

Figure 22:
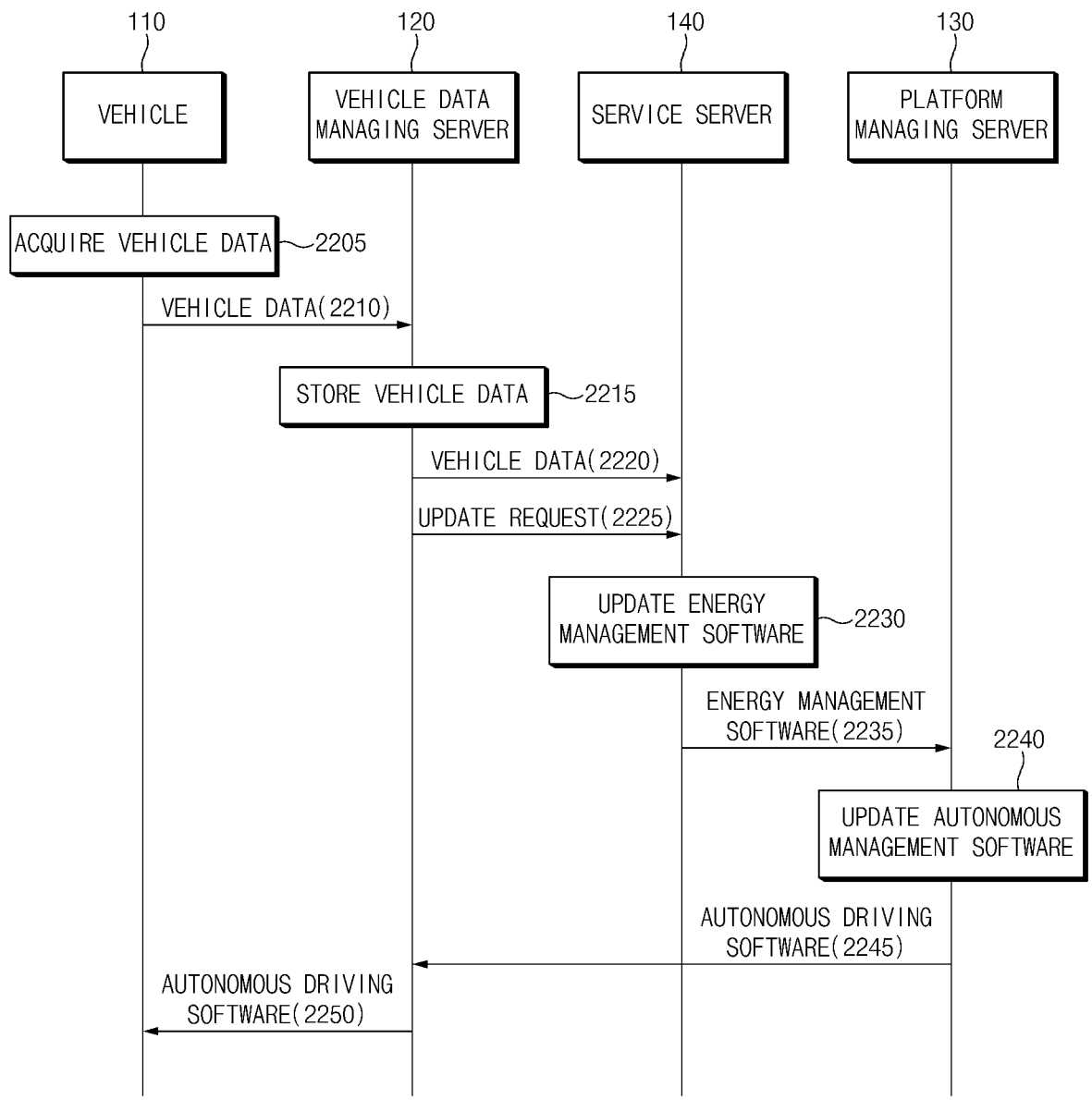

FIG. 22 is an operation flowchart of a vehicle, a vehicle data managing server, a platform managing server, and a service server according to some embodiments. FIG. 22 may be described using the configurations of FIGS. 1, 2A, 7, 8, and 10.

The embodiment illustrated in FIG. 22 is illustrative of only some embodiments, and the order of steps according to various embodiments of the present disclosure may be different from that illustrated in FIG. 22, and some steps illustrated in FIG. 22 may be omitted or the order between the steps may be changed or the steps may be merged.

Referring to FIG. 22, in operation 2205, the vehicle 110 may acquire vehicle data through the sensor module 220, the camera module 230, and/or the BMS 271. Here, the vehicle data may include driving data related to driving of the vehicle 110 and/or battery data related to a state of the battery (e.g., voltage data, current data, temperature data, and/or state of charge (SOC) data). In addition, the vehicle data may include a vehicle model code, a vehicle identification code, a battery model code, and/or a battery identification code as data identification information.

In operation 2210, the vehicle 110 may transmit the vehicle data acquired in operation 2205 or stored in the memory 240 to the vehicle data managing server 120.

In operation 2215, the vehicle data managing server 120 may store the vehicle data acquired in operation 510 in at least one storage means (e.g., a memory).

In operation 2220, the vehicle data managing server 120 may transmit the vehicle data to the service server 140.

In operation 2225, the vehicle data managing server 120 may transmit an update request signal of the energy management software 421 to the service server 140.

In operation 2230, the service server 140 may update the energy management software 1021 in response to the vehicle data acquired in operation 2220 and the update request signal acquired in operation 2225. According to some embodiments, the service server 140 may update the energy management software 1021 based on the vehicle data. According to some embodiments, the battery state diagnosis software may diagnose the degree of degradation of the battery using an artificial intelligence model. Here, the artificial intelligence model is a software algorithm coded in a programming language and may be an artificial neural network. In this case, the service server 140 may update the energy management software 1021 by additionally training the artificial intelligence model based on the vehicle data.

In operation 2235, the service server 140 may transmit the updated energy management software 1021 or first update software to the platform managing server 130. Here, the first update software may be software for updating the energy management software included in the autonomous driving software 821 stored in the memory 820 of the platform managing server 130 to the same version as the energy management software 1021 updated by the service server 140.

In operation 2240, the platform managing server 130 may update the autonomous driving software 821 stored in the memory 820 based on the updated energy management software or the first update software acquired in operation 2235.

In operation 2245, the platform managing server 130 may transmit the updated autonomous driving software 821 or second update software to the vehicle data managing server 120. Here, the second update software may be software for updating the autonomous driving software installed in the vehicle 110 to the same version as the autonomous driving software 821 updated by the platform managing server 130.

In operation 2250, the vehicle data managing server 120 may transmit the updated autonomous driving software 821 or the second update software acquired in operation 2245 to the vehicle 110.

Terms such as "include", "comprise", or "have", and so forth mean that the corresponding component may be included therein unless otherwise specified, and thus it should be interpreted as being able to further include other components rather than excluding other components. All terms, including technical or scientific terms, have the same meaning as commonly understood by a person ordinary skilled in the art to which the embodiments disclosed in this disclosure belong, unless defined otherwise. Commonly used terms, such as terms defined in a dictionary, should be interpreted as being consistent with the contextual meaning of the related art, and unless explicitly defined in this disclosure, they are not interpreted in an ideal or excessively formal meaning.

What is claimed is:

1. A system comprising:
   a platform managing server configured to manage a simulation platform that provides a simulation related to a driving environment of a vehicle;
   a vehicle data managing server configured to:
      acquire vehicle data including driving data related to driving of the vehicle and battery data related to a state of a battery of the vehicle; and
      provide the vehicle data and a simulation request to the platform managing server, wherein the simulation request is based on the vehicle data; and
   a service server configured to:
      receive the vehicle data from the platform managing server;
      manage energy management software that generates energy management data based on the vehicle data, and
      provide the energy management data to the platform managing server.

2. The system of claim 1,
   wherein the energy management data includes at least one of diagnostic data obtained by diagnosing the state of the battery of the vehicle, lifespan data obtained by analyzing a lifespan of the battery, first control data for controlling an operation of the battery, usage guide data of the battery, or second control data for controlling driving operations of the vehicle or an electrical module of the vehicle.

3. The system of claim 2,
wherein the energy management data includes the lifespan data, and
wherein the service server is configured to manage the energy management software to receive the vehicle data, acquire regenerative braking information of the vehicle using the vehicle data, derive the lifespan data from the obtained regenerative braking information, and provide the lifespan data to the simulation platform.

4. The system of claim 3,
wherein the vehicle data used to acquire the regenerative braking information includes a vehicle velocity and battery state of charge.

5. The system of claim 3,
wherein the service server is configured to manage the energy management software to analyze the lifespan of the battery such that the lifespan of the battery is determined to decrease as a count of regenerative braking occurrences included in the regenerative braking information of the vehicle increases.

6. The system of claim 2,
wherein the service server is configured to manage the energy management software to derive the lifespan of the battery based further on driving mode information included in the vehicle data.

7. The system of claim 2,
wherein the energy management data includes the first control data,
wherein the first control data controls a venting operation of the battery, and
wherein the service server is configured to manage the energy management software to generate the first control data in response to a time to collision (TTC) of the vehicle included in the vehicle data being less than or equal to a threshold value.

8. The system of claim 2,
wherein the energy management data includes the second control data,
wherein the second control data controls an operation priority or an operation cycle of a sensor module mounted on the vehicle, and
wherein the service server is configured to manage the energy management software to generate the second control data based on the battery data included in the vehicle data.

9. A system comprising:
a platform managing server configured to manage a simulation platform that provides a simulation related to a driving environment of a vehicle;
a vehicle data managing server configured to:
acquire vehicle data including driving data related to driving of the vehicle and battery data related to a state of a battery of the vehicle; and
provide the vehicle data and a simulation request to the platform managing server, wherein the simulation request is based on the vehicle data; and
a service server configured to manage energy management software, wherein the service server is configured to provide energy management data to the platform managing server,
wherein the platform managing server is configured to generate a virtual environment corresponding to the vehicle data in response to the simulation request.

10. The system of claim 9,
wherein the platform managing server is configured to:
perform an autonomous driving simulation in the virtual environment,
collect simulation data during the performance of the simulation, and
update autonomous driving software based on the simulation data, the energy management data, or both.

11. The system of claim 10,
wherein the platform management server is configured to transmit the updated autonomous driving software to at least one of the vehicle or the vehicle data managing server.

12. The system of claim 1,
wherein the platform managing server is configured to transfer the vehicle data to the service server in response to (i) an update request for the energy management software or (ii) a determination that the vehicle data matches one or more energy management services.

13. The system of claim 12,
wherein the one or more energy management services include at least one of: a battery condition diagnosis, a battery lifespan prediction, or provision of a battery usage guide.

14. The system of claim 12, wherein the service server is configured to:
update the energy management software using the vehicle data received from the platform management server; and
provide the updated energy management software to the platform management server.

15. A method comprising:
managing, by a platform management server, a simulation platform that provides a simulation related to a driving environment of a vehicle;
acquiring, by a vehicle data managing server, vehicle data including driving data related to driving of the vehicle and battery data related to a state of a battery of the vehicle;
providing, by the vehicle data managing server, the vehicle data and a simulation request to the platform managing server, wherein the simulation request is based on the vehicle data; and
receiving, by a service server, the vehicle data from the platform managing server,
managing, by the service server, energy management software that generates energy management data based on the vehicle data, and
providing, by the service server, the energy management data to the platform management server.

16. The method of claim 15,
wherein the energy management data includes at least one of diagnostic data obtained by diagnosing the state of the battery of the vehicle, lifespan data obtained by analyzing a lifespan of the battery, first control data for controlling an operation of the battery, usage guide data of the battery, or second control data for controlling driving operations of the vehicle or an electrical module of the vehicle; and
wherein the energy management software provides one or more energy management services including at least one of: a battery condition diagnosis, a battery lifespan prediction, or provision of a battery usage guide.

17. The method of claim 16,
wherein the energy management data includes the lifespan data, and
the method further comprises:
- managing, by the service server, the energy management software to receive the vehicle data, wherein the vehicle data used to acquire the regenerative braking information includes a vehicle velocity and battery state of charge;
- acquiring, by the service server, regenerative braking information of the vehicle using the vehicle data;
- deriving, by the service server, the lifespan data from the obtained regenerative braking information; and
- providing, by the service server, the lifespan data to the simulation platform.

18. The method of claim 16,
wherein the method further comprises managing, by the service server, the energy management software to at least one of:
- analyze the lifespan of the battery such that the lifespan of the battery is determined to decrease as a count of regenerative braking occurrences included in the regenerative braking information of the vehicle increases;
- derive the lifespan of the battery based further on driving mode information included in the vehicle data;
- generate first control data controlling a venting operation of the battery in response to a time to collision (TTC) of the vehicle included in the vehicle data being less than or equal to a threshold value; or
- generate second control data controlling an operation priority or an operation cycle of a sensor module mounted on the vehicle, wherein the second control data based on the battery data included in the vehicle data.

19. The method of claim 15, wherein the method further comprises:
- generating, by the platform managing server, a virtual environment corresponding to the vehicle data in response to the simulation request;
- performing, by the platform managing server, an autonomous driving simulation in the virtual environment;
- collecting, by the platform managing server, simulation data during the performance of the simulation; and
- updating, by the platform managing server, autonomous driving software based on the simulation data, the energy management data, or both.

20. The method of claim 15,
wherein the method further comprises transferring, by the platform managing server, the vehicle data to the service server in response to (i) an update request for the energy management software or (ii) a determination that the vehicle data matches one or more energy management services, including at least one of: a battery condition diagnosis, a battery lifespan prediction, or provision of a battery usage guide.

* * * * *